(12) United States Patent
Hwang et al.

(10) Patent No.: US 7,277,218 B2
(45) Date of Patent: *Oct. 2, 2007

(54) ELECTROPHORETIC COMPOSITIONS

(75) Inventors: Jiunn Jye Hwang, Taipei (TW); HongMei Zang, Sunnyvale, CA (US); Yajuan Chen, Fremont, CA (US); Xin Weng, Cotati, CA (US); Jack Hou, Fremont, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 10/976,152

(22) Filed: Oct. 27, 2004

(65) Prior Publication Data

US 2005/0264868 A1    Dec. 1, 2005

Related U.S. Application Data

(60) Provisional application No. 60/517,520, filed on Nov. 4, 2003.

(51) Int. Cl.
*G02B 26/00* (2006.01)

(52) U.S. Cl. ..................................... 359/296; 252/581
(58) Field of Classification Search ................. 359/296
See application file for complete search history.

(56) References Cited

U.S. PATENT DOCUMENTS

| | | |
|---|---|---|
| 3,006,921 A | 10/1961 | Weinmayr |
| 3,281,426 A | 10/1966 | Van Dyke Tiers |
| 3,612,758 A | 10/1971 | Evans et al. |
| 4,059,451 A | 11/1977 | Oita et al. |
| 4,077,936 A * | 3/1978 | Tanaka et al. ............. 523/208 |
| 4,085,137 A | 4/1978 | Mitsch et al. |
| 4,094,911 A | 6/1978 | Mitsch et al. |
| 4,285,801 A | 8/1981 | Chiang |
| 4,655,897 A | 4/1987 | DiSanto et al. |
| 4,772,103 A * | 9/1988 | Saxe .......................... 359/296 |
| 5,177,476 A | 1/1993 | DiSanto et al. |
| 5,260,435 A | 11/1993 | Sawada et al. |
| 5,378,589 A | 1/1995 | Sawada et al. |
| 5,460,688 A | 10/1995 | DiSanto et al. |
| 5,573,711 A * | 11/1996 | Hou et al. .................. 252/572 |
| 5,930,026 A | 7/1999 | Jacobson et al. |
| 5,961,804 A | 10/1999 | Jacobson et al. |
| 6,084,057 A | 7/2000 | Gibbons et al. |
| 6,162,521 A | 12/2000 | Falcone |
| 6,187,954 B1 | 2/2001 | Falcone |

(Continued)

FOREIGN PATENT DOCUMENTS

WO    WO 01/067170    9/2001

(Continued)

OTHER PUBLICATIONS

U.S. Appl. No. 60/493,703, filed Aug. 2003, Yang et al.

(Continued)

*Primary Examiner*—Jessica Stultz
(74) *Attorney, Agent, or Firm*—Howrey LLP

(57) ABSTRACT

This invention relates to a novel electrophoretic composition having improved colloidal stability, switching performance and temperature latitude.

63 Claims, 7 Drawing Sheets

U.S. PATENT DOCUMENTS

| | | | |
|---|---|---|---|
| 6,239,896 B1 | 5/2001 | Ikeda | |
| 6,549,327 B2* | 4/2003 | Foucher et al. | 359/296 |
| 6,672,921 B1 | 1/2004 | Liang et al. | |
| 6,693,620 B1 | 2/2004 | Herb et al. | |
| 6,781,745 B2 | 8/2004 | Chung et al. | |
| 6,806,995 B2 | 10/2004 | Chung et al. | |
| 6,822,782 B2* | 11/2004 | Honyeman et al. | 359/296 |
| 6,933,098 B2 | 8/2005 | Chan-Park et al. | |
| 2002/0131152 A1 | 9/2002 | Liang et al. | |
| 2005/0136347 A1 | 6/2005 | Gu et al. | |
| 2005/0227155 A1 | 10/2005 | Minami | |
| 2006/0245038 A1* | 11/2006 | Albert et al. | 359/296 |

FOREIGN PATENT DOCUMENTS

| | | |
|---|---|---|
| WO | WO 02/001281 | 1/2002 |
| WO | WO 02/065215 | 8/2002 |
| WO | WO 03/023510 | 3/2003 |
| WO | WO 03/038512 | 5/2003 |
| WO | WO 03/057360 | 7/2003 |
| WO | WO 03/058335 | 7/2003 |
| WO | WO 03/069403 | 8/2003 |
| WO | WO 03/097747 | 11/2003 |
| WO | WO 2004/012001 | 2/2004 |
| WO | WO 2004/068234 | 8/2004 |

OTHER PUBLICATIONS

U.S. Appl. No. 60/501,921, filed Sep. 2003, Yang et al.

U.S. Appl. No. 10/903,923, filed Jul. 2004, Yang et al.

Allen, K. (Oct. 2003). Electrophoretics Fulfilled. *Emerging Displays Review: Emerging Display Technologies, Monthly Report—October 2003*, 9-14.

Caporiccio, et al. (1983) Low Temperature Elastomeric Polyamides Containing Perfluorinated Polyether Building Blocks. *Makromol. Chem.* 184, pp. 935.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation available upon request).

Dalisa, A.L. (Jul. 1977) Electrophoretic Display Technology. *IEEE Trans. Dev.*, pp. 827.

Diamond, A.S. editor. (2002) *Handbook of Imaging Materials*. Marcel Dekker.

Green, F.J. (1990) *The Signma-Aldrich Handbook of Stains, Dyes and Indicators*. Aldrich Chemical Co.

Gregory, P. Et al (1991) *High Technology Applications of Organic Colorants*. Plenum Publishing Corp.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Hopper and V. Novotny, An Electrophoretic Display, Its Properties, Model, and Addressing. *IEEE Trans. Electr. Dev.*, 26(8):1148-1152, (1979).

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Oct. 2004) *Flexible and Roll-able Display/Electronic Paper—A Technology Overview*. Paper presented at the METS 2004 Conference in Taipei, Taiwan.

Liang, R.C. (Apr. 2004), *Microcup Electronic Paper by Roll-to-Roll Manufacturing Process*. Presentation at the Flexible Displays & Electronics 2004 of Intertech, San Fransisco, California, USA.

Liang, R.C. (Feb. 2003) *Micro(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C., Zang, H.M., Wang, X., Chung, J. & Lee, H., (Jun./Jul. 2004) *Format Flexible Microcup (R) Electronic Paper by Roll-to-Roll Manufacturing Process*. Presentation conducted at the 14th FPD Manufacturing Technology EXPO & Conference.

Malik, et al, (1991) Synthesis of Fluorinated Diisocyanates. *J. Org. Chem.* 56, pp. 3043.

Mashlyakovskiy, Leonid, et al. (1999) Fluoropolyethers End-Capped by Polar Functional Groups. I. Kinetic Approach to the Reaction of hydroxy-Terminated Fluoropolyethers with Cycloalyphatic and Aromatic Diisocyanates. *Journal of Polymer Science : Part A*. vol. 37, pp. 557.

Mashlyakovskiy, Leonid, et al. (1999) Fluoropolyethers End-Capped by Polar Functional Groups. II. Effect of Catalyst and Reagents Concentration, Solvent Nature, and Temperature on Reaction Kinetics of α, ω-Bis(hydroxy)-Terminated Fluoropolyethers with Cycloalyphatic and Aromatic Diisocyanates. *Journal of Polymer Science : Part A*. vol. 37, pp. 2579.

Mashlyakovskiy, Leonid, et al. (2002) Fluoropolyethers End-Capped by Polar Functional Groups. III. Kinetics of the Reactions of Hydroxy-Terminated Fluoropolyethers and Model Fluorinated Alcohols with Cyclohexyl Isocyanate Catalyzed by Organotin Compounds. *Journal of Polymer Science : Part A*. vol. 40, pp. 3771.

Mossman, M.A., et al. (2002) Grey Scale Control of TIR Using Electrophoresis of Sub-Optical Pigment Particles, *SID 02 Digest*, pp. 522.

Mossman, M.A., et al (2001) New Reflective Color Display Techniques Based on Total Internal Reflection and Subtractive Color Filtering. *SID 01 Digest*, pp. 1054, (2001).

Mossman, M.A. et al (2001) New Reflective Display Based on Total Internal Reflection in Prismatic Microstructure. *SID IDRC Proceedings*, pp. 311.

Nikkei Microdevices. (Dec. 2002) Newly-Developed Color Electronic Paper Promises—Unbeatable Production Efficiency. *Nikkei Microdevices*, 3. (in Japanese, with English translation).

Ota, et al (1977) Developments in Electrophoretic Displays. *SID Proceedings*, 18, pp. 243.

Richmon, J.M. editor. (1990) *Cationic Surfactants: Organic Chemistry*. Surfactant Science Series vol. 34, Marcek Dekker.

Tonelli, et al. (2002) Perfluoropolyether Functional Oligomers: Unusual Reactivity in Organic Chemistry. *J. Fluorine Chemistry*. 118, pp. 107.

Wang, X., Kiluk, S., Chang, C., & Liang, R.C., (Jun. 2004) Microcup® Electronic Paper and the Converting Processes. *Advanced Display*, Issue 43, 48-51.

Wang, X., Kiluk, S., Chang, C. & Liang, R.C. (Feb. 2004). Microcup (R) Electronic Paper and the Converting Processes. *ASID*, 10.1.2-26, 396-399, Nanjing, China.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

* cited by examiner

ELECTROPHORETIC COMPOSITIONS

RELATED APPLICATION

This application claims the priority under 35 USC 119(e) of U.S. Provisional Application No. 60/517,520 filed on Nov. 4, 2003, the content of which is incorporated herein by reference in its entirety.

BACKGROUND OF THE INVENTION

1. Field of the Invention

This invention relates to a novel electrophoretic composition having improved colloidal stability, switching performance and temperature latitude.

2. Brief Description of Related Art

The electrophoretic display (EPD) is a non-emissive device based on the electrophoresis phenomenon of charged pigment particles suspended in a dielectric solvent. It was first proposed in 1969. The display usually comprises two plates with electrodes placed opposing each other and separated by spacers. One of the electrodes is usually transparent. A suspension composed of a dielectric solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, IEEE Trans. Electr. Dev., 26(8):1148-1152 (1979)), there are partitions between the two electrodes for dividing the space into smaller cells in order to prevent undesired movement of particles such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors. Microprisms or microgrooves have also been used in the total internal reflection (TIR) type of EPDs [see M. A. Mossman, et al, SID 01 Digest pp. 1054 (2001); SID IDRC proceedings, pp. 311 (2001) and SID'02 Digest, pp. 522 (2002)].

An improved EPD technology was disclosed in co-pending applications, U.S. Ser. No. 09/518,488 filed on Mar. 3, 2000 (corresponding to WO01/67170), U.S. Ser. No. 09/606,654 filed on Jun. 28, 2000 (corresponding to WO02/01280) and U.S. Ser. No. 09/784,972 filed on Feb. 15, 2001 (corresponding to WO02/65215). The improved EPD comprises closed cells formed from microcups of well-defined shape, size and aspect ratio and filled with charged pigment particles dispersed in a dielectric solvent or solvent mixture.

As in liquid crystal and other displays, an EPD may be a segment display, a passive matrix display or an active matrix display, depending on the driving mechanism and the circuitry design. The passive matrix driving system is one of the most cost effective driving mechanisms. The system has row electrodes on the top side and column electrodes on the bottom side, of the cells. In most cases, the top row electrodes and the bottom column electrodes are perpendicular to each other. Generally, a threshold voltage of no less than ⅓ of the driving voltage is required to suppress or eliminate the undesirable crosstalk or cross-bias effect in adjacent pixels of a passive matrix display.

Crosstalk occurs when the particles in a cell are biased by the electric field of a neighboring cell. Widening the distance between adjacent cells may eliminate such a problem; but the distance may also reduce the resolution of the display. Alternatively, the crosstalk problem can be lessened if a cell has a significantly high threshold voltage. A large gamma (or a steep slope) of the response-voltage characteristic curve is also desirable to increase the resolution of a passive matrix device. However, cells in EPDs formed using the electrophoretic materials and techniques currently available typically do not have the required response-voltage characteristics to prevent the undesirable movement of particles. As a result, the EPDs constructed from these materials and techniques usually cannot achieve high resolution.

Cross bias is another well-known problem associated with a passive matrix display. The voltage applied to a column electrode not only provides the driving bias for the cells in the scanning row, but it also affects the bias across the non-scanning cells in the same column. This undesired bias may force the particles of non-scanning cells to migrate to the opposite electrode. This undesirable particle migration causes visible optical density change and reduces the contrast ratio of the display.

In addition, in order to scan through all rows of electrodes in a frame within a reasonable time scale, a fast response rate is also highly desirable. However, none of the EPDs currently available has shown an acceptable threshold characteristics or response rate required.

Most electrophoretic dispersions do not have the required threshold characteristics to suppress or eliminate the undesirable cross-talk or cross-bias among adjacent pixels during matrix driving. Electrophoretic dispersions having threshold characteristics have been reported by, for example, I. Ota, et al, in SID Proceedings, 18, 243 (1977) and Evans, et al, in U.S. Pat. No. 3,612,758. In most cases, the threshold voltage was achieved with trade-offs in, for example, response time, operating voltage, image uniformity or display longevity, probably due to irreversible flocculation and/or network formation, and sometimes, undesirable redox reaction(s) and/or electrodeposition at the electrode surface.

To suppress the cross effect, an additional conductor layer or grid electrode has been disclosed in, for example, IEEE Trans. Electr. Dev., p. 827, July (1977), U.S. Pat. Nos. 3,612,758, 4,655,897, 5,177,476 and 5,460,688, U.S. Ser. No. 10/242,335 filed on Sep. 11, 2002 (corresponding to WO03/23510) and U.S. Ser. No. 10/282,444 filed on Oct. 28, 2002 (corresponding to WO03/38512). However, the manufacturing cost for such multilayer electrode structures is very high. Alternatively, magnetic particles and a magnetic electrode have been disclosed in U.S. Pat. No. 6,239,896 (assigned to Canon) to provide the required threshold, also at the expense of manufacturing cost.

The temperature latitude, particularly the stability of threshold characteristics as a function of operation temperature, is another issue which is often associated with electrophoretic displays. The composition of the electrophoretic dispersion determines, to a large extent, the temperature latitude of the display.

The content of each document referred to in this application is incorporated by reference into this application in its entirety.

SUMMARY OF THE INVENTION

The present inventors have now found a group of additives which can induce and enhance the threshold voltage and simultaneously improve the temperature latitude, of an electrophoretic display.

The first aspect of the present invention is directed to a method for inducing and enhancing the threshold voltage and also improving the temperature latitude of an electrophoretic display, which method comprises adding a highly fluorinated additive into an electrophoretic dispersion which comprises electrophoretic particles dispersed in a dielectric solvent or solvent mixture. The highly fluorinated additive comprises at least one functional moiety selected from the group consisting of oxy, carboxyl, amide, urea, urethane and the like. Such additives having a functional moiety which does not have a labile hydrogen are preferred, particularly when the electrophoretic particles are positively charged.

The highly fluorinated additive may be soluble or dispersible in an electrophoretic dispersion.

More preferably, the additive comprises more than 20% by weight, more preferably more than 30% by weight, and most preferably more than 50% by weight, of fluorine. In one embodiment, the additive is a derivative of a perfluoropolyether or hydrofluoropolyether.

The second aspect of the invention is directed to an electrophoretic dispersion which comprises electrophoretic particles dispersed in a dielectric solvent or solvent mixture and one or more additive as described in the first aspect of the invention.

The third aspect of the invention is directed to an electrophoretic display comprising display cells filled with an electrophoretic dispersion comprising electrophoretic particles dispersed in a dielectric solvent or solvent mixture and one or more additive of the first aspect of the invention.

DETAILED DESCRIPTION OF THE INVENTION

Definitions

Figure 1:
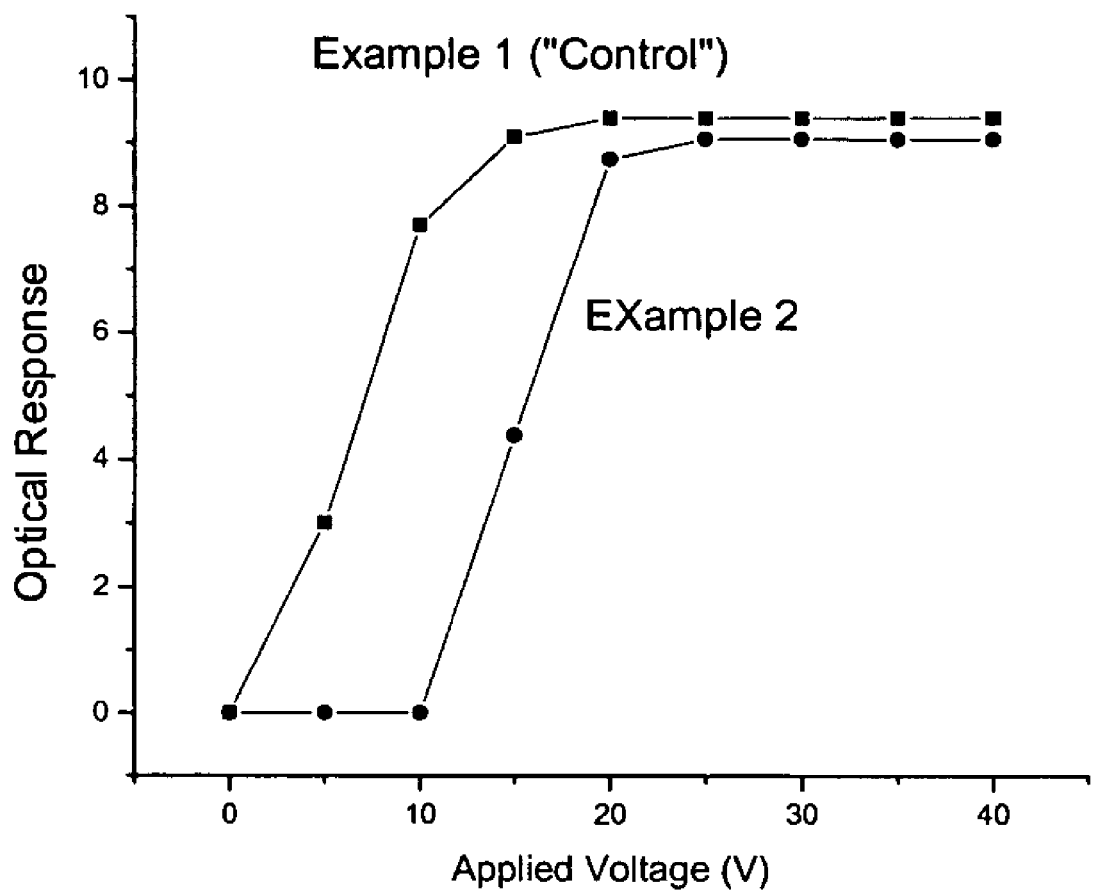
FIG. 1 illustrates the electro-optical response of Comparative Example 1 and Example 2 measured from 0 to 40 volts. Example 2 shows significant threshold characteristics.

Unless defined otherwise in this specification, all technical terms are used herein according to their conventional definitions as they are commonly used and understood by those of ordinary skill in the art. Tradenames are identified for materials used and their sources are also given.

The term "threshold voltage", in the context of the present invention, is defined as the minimum voltage required for achieving an observable display contrast ratio within the time scale of scanning a row of cells (in a passive matrix display). It is the maximum bias voltage that may be applied to a cell without causing movement of particles between two electrodes on opposite sides of the cell.

The term "contrast ratio" is defined as the ratio of the reflectance of an electrophoretic display at the minimum optical density (Dmin) to the reflectance at the maximum optical density (Dmax) of the display background.

The term "gamma" is defined as the slope of the optical response vs. applied voltage curve.

The term "electrode protecting layer" refers to the sealing or adhesive layer in an electrophoretic display prepared by, for example, the microcup technology as disclosed in WO01/67170.

The term "alkyl" refers to a linear, branched or cyclic hydrocarbon chain. Unless otherwise indicated, the "alkyl" group, in the context of the present application, may have 1 to 20, preferably 1 to 12, carbon atoms. Examples of "alkyl" may include methyl, ethyl, cyclohexyl, octyl, n-decyl and the like which is optionally unsaturated, such as ethenyl, 3-hexenyl or the like.

The term "heteroalkyl" refers to an alkyl group in which one or more of carbon atoms are replaced by O, S or N.

The term "aryl" refers to an organic radical derived from an aromatic ring preferably having 6 to 18 carbon atoms including, but not limited to, phenyl, biphenyl, naphthyl, anthracenyl and the like.

The term "heteroaryl" refers to an organic radical derived from an aromatic hydrocarbon in which one or more of the ring carbon atoms are replaced by O, S or N, such as thienyl, furyl, pyrrolyl, pyridinyl, imidazolyl or the like.

In the context of the present application, the terms "alkyl" and "aryl" may include alkyl and aryl optionally substituted with a metal, such as B, Si, Se, Cu, Ca, Zn, Mg, Ti, Co or Zr.

The term "alkylene" refers to a bivalent group derived from an alkyl moiety by removal of a hydrogen atom from each of two carbon atoms, preferably the two end carbon atoms.

The term "arylene" refers to a bivalent group derived from an aryl moiety by removal of a hydrogen atom from each of two ring carbon atoms.

The terms "alkoxy" and "aryloxy" refer to the moieties of alkyl-O— and aryl-O—, respectively.

Unless otherwise indicated, the term "optionally substituted" is to indicate a moiety which may or may not be substituted with one or more of the following: halogen, alkyl, heteroalkyl, aryl, heteroaryl, NC—, —NCO, HO(O)C—, R*O—, R*HN—, R*$_2$N—, R*S—, R*CO—, R*C(O)O—, R*O(O)C—, R*NHC(O)—, R*$_2$NC(O)—, R*NHC(O)O—, R*OC(O)NH—, R*C(O)NH—, R*C(S)NH—, R*NHC(O)NH—, R*NHC(S)NH—, R*SC(O)NH—, R*=N—, R*NHC(O)S— and the like (wherein R* is hydrogen, optionally substituted alkyl, optionally substituted aryl or optionally substituted polyether). The optionally substituted moiety may be an alkyl or aryl. In the context of the present invention, it is preferable that the substituent(s) do not comprise a functional group capable of interfering the hydrogen bonding, acid-base interaction or interfacial interaction between the particle surface and the additive(s).

The term "halogenated" or "fluorinated" refers to a moiety which is partially or completely substituted with halogen atoms or fluorine atoms, respectively. For example, the term "fluoroalkyl" or "fluorinated alkyl" refers to an alkyl in which some or all of the hydrogen atoms in the alkyl moiety are replaced with fluorine atoms.

The term "polyether" refers to a radical formed by the removal of one hydrogen atom from a polyether that is an oligomer, co-oligomer, polymer or co-polymer of one or more optionally substituted alkylene oxides. Preferably a polyether radical in the present application is an oligomer, co-oligomer, polymer or co-polymer of either propylene oxide, ethylene oxide or both. The polyether may also comprise one or more methylene oxide moiety if it is fluorinated. In one embodiment, the polyether in the present application is a perfluoropolyether or hydrofluoropolyether.

A "perfluoropolyether" is a polyether radical which is completely fluorinated.

A "hydrofluoropolyether" is a polyether radical which is partially fluorinated.

The term "optionally substituted polyether" refers to a polyether described above which is optionally substituted with —OH, -alkyl or -aryl.

The term "monovalent" refers to a moiety which has only one substitution site. The term "divalent" refers to a moiety which has two substitution sites. The term "multivalent" refers to a moiety which has multiple substitution sites.

Naming of complex substituents follows the rule that the secondary substituent on the moiety being substituted is named first and the primary substituent through which the secondary substituent is connected to the moiety being substituted is named second. Thus a "hydroxyethyl" radical is an ethyl radical substituted by a hydroxy radical, an "arylalkyl" radical is an alkyl radical (as defined) that is substituted by an aryl radical (as defined), etc.

I. Technical Background

A. Electrophoretic Particles in the Electrophoretic Dispersion

The term "electrophoretic pigment particles", in the context of the present application, may broadly include primary pigment particles, electrophoretic pigment microparticles, core-shell particles, hollow particles that scatter light, and the like.

The electrophoretic particles are preferably microparticles having a pigment, in the form of particles, contained therein.

Suitable primary pigment particles are well known in the art. They are preferably white, and may be organic or inorganic pigments, such as $TiO_2$. If colored pigment particles are used, they may be formed from organic or inorganic pigments known in the art. Particle size of the primary pigment particles is preferably in the range of about 0.01 to about 5 microns, more preferably in the range of about 0.05 to about 2 microns. The primary pigment particles may exhibit a native charge, or may be charged explicitly using a charge controlling agent or may acquire a charge when suspended in the dielectric solvent. Suitable charge controlling agents are well known in the art; they may be polymeric or non-polymeric in nature and may also be ionic or non-ionic, including ionic surfactants.

Suitable charged primary pigment dispersions may be manufactured by any of the well-known methods including grinding, milling, attriting, microfluidizing and ultrasonic techniques.

The "electrophoretic pigment microparticles" referred to in this section are prepared from a microparticle forming/microencapsulation process. Such a process may be accomplished chemically or physically. Typical microparticle forming/microencapsulation processes include interfacial polymerization, in-situ polymerization, phase separation, coacervation, electrostatic coating, spray drying, fluidized bed coating, solvent evaporation and the like.

Electrophoretic pigment microparticles prepared from any of the processes known in the art may be used in the present invention.

One of the preferred microparticle forming processes is disclosed in the co-pending applications, U.S. Ser. No. 10/335,051 filed on Dec. 31, 2002 (corresponding to WO 03/57360), U.S. Ser. No. 10/335,210 filed on Dec. 31, 2002 (corresponding to WO 03/58335) and U.S. Ser. No. 10/632, 171 filed on Jul. 30, 2003.

Briefly, the process may comprise:
(a) preparing a solution comprising a polymer precursor such as a monomer or oligomer ("precursor/internal phase" or phase "I");
(b) emulsifying the precursor/internal phase into a fluorinated solvent or solvent mixture ("continuous phase" or phase "F"); and
(c) forming electrophoretic pigment microparticles by hardening the emulsion.

The hardening of the emulsion may be accomplished by polymerization/ crosslinking of the monomers or oligomers, including interfacial and/or in-situ polymerization/crosslinking. The polymer precursor(s) may be partially polymerized/crosslinked in step (a) before the emulsification step (b).

A pigment, in the form of particles, may be predispersed in the precursor/internal phase. The pigment may be one of those primary pigments known in the art. This type of microparticles is referred to as pigment-containing microparticles.

Suitable monomers or oligomers for interfacial and in-situ polymerization/crosslinking may include multifunctional isocyanates, thioisocyanates, epoxides, acid chlorides, chloroformates, alkoxysilanes, anhydrides, alcohols, thiols, amines and precondensates thereof. The monomer or oligomer is present in the amount of from about 5 to about 300% by weight, more preferably from about 50 to about 150% by weight and most preferably from about 80 to about 120% by weight, based on the total solid of the electrophoretic pigment microparticles.

Suitable fluorinated solvents for step (b) generally have a low vapor pressure, a low viscosity and a dielectric constant in the range of about 1.7 to about 30, more preferably about 1.7 to about 5. Examples of suitable fluorinated solvents may include, but are not limited to, perfluorinated solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as perfluoropolyethers HT series and hydrofluoropolyethers (ZT series) from Solvay Solexis, FC43 (heptacosafluorotributylamine), FC-70 (perfluorotri-n-pentylamine), PF-5060 or PF-5060DL (perfluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly (chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as Solvay Solexis HT-170, HT-200, HT-230, ZT-180 and Dupont trifluoro(trifluoromethyl)-oxirane homopolymers (such as K-6 and K-7 fluids) are particularly useful.

To facilitate the emulsification process, a fugitive solvent or diluent may be used to reduce the viscosity of the precursor/internal phase and it is removed later by heat and/or vacuum during or after the emulsification step.

In the preparation of the fluorinated solution (phase "F"), a protective colloid or dispersant may be optionally added to improve the dispersion stability and control the particle size and particle size distribution of the microparticles. The preferred protective colloids or dispersants are disclosed in the co-pending application, U.S. Ser. No. 10/335,051 filed Dec. 31, 2002.

Optionally, a charge controlling agent (CCA) such as those acid-base or donor-acceptor type of CCAs as disclosed in the co-pending patent application, U.S. Ser. No. 10/335,210 filed Dec. 31, 2002 or the fluorinated quaternary salts or the fused ring or polynuclei derivatives or isomers thereof as disclosed in U.S. Ser. No. 10/632,171 filed Jul. 30, 2003, may also be added in the microparticle forming process.

The CCA may be soluble or dispersible in phase "F" and added in the emulsification step (b). Optionally they may also be added in step (c) of the process. The CCA preferably comprises a reactive functional group for interfacial polymerization/crosslinking. Suitable reactive CCAs have reactive functional groups such as unsaturated double bonds including, but not limited to, vinyls, dienes, acrylates or methacrylates, primary or secondary amines, anilines, ureas, thioureas, alcohols, thiols, isocyanates, thioisocyanates, imines, epoxides, acid anhydrides, acid chlorides, chloroformates and the like.

Optionally a fluorinated organometallic compounds may be used as a CCA and added in step (b) of the microparticle forming process. Preferred fluorinated metal organic compounds may include, but are not limited to, fluorinated metal naphthalocyanine or phthalocyanine dyes (such as CuPc-$R_f$ wherein $R_f$ may be $C_nH_xF_{2n+1-x}$ wherein n=1-18, preferably 4-12 and x is adjusted so that the fluorine content is no less than 10 wt % by weight, preferably no less than 40 wt % by weight), fluorinated quinolinol metal complexes and metal perfluoroacetoacetonates. The preferred metals may include Cu, Co, Ni, Ti, Fe, Mg, Zn, Zr and Al, with Cu being the most preferred. Fluorinated metal phthalocyanine and naphthalocyanine dyes may be prepared by the procedures as disclosed in U.S. Pat. No. 3,281,426 (1966).

A second monomer or oligomer may also optionally be added to further harden the microparticles by, for example, in-situ radical and/or condensation polymerization during or after the interfacial polymerization/crosslinking step. Suitable second monomers or oilgomers for the in-situ polymerization/crosslinking reaction in the precursor/internal phase may include monomers for radical or ionic polymerization such as vinyls, acrylates, methacrylates, styrenes, allyls, vinylethers and multifunctional derivatives thereof and monomers for condensation polymerization such as polyols, polythiols, anhydrides, polyamines, isocyanates, thioisocyanates or epoxides.

The size of the electrophoretic pigment particles particularly the pigment-containing microparticles typically ranges from about 0.01 to about 5 microns, preferably from about 0.05 to about 2 microns.

Examples of core-shell particles may be found in, for example, the co-pending application, U.S. Ser. No. 10/364,270 filed on Feb. 10, 2003 (corresponding to WO 03/69403).

B. Dielectric Solvents

Suitable dielectric solvents are solvents of a low viscosity, a low vapor pressure and a low dielectric constant. Particularly suitable solvents are fluorinated solvents having a low vapor pressure, a low viscosity and a dielectric constant in the range of about 1.7 to about 30, more preferably about 1.7 to about 5. Specific examples are given in the previous section for the microencapsulation process.

In addition to the electrophoretic pigment particles, a contrasting colorant may be used in the electrophoretic dispersion of the present invention. The contrast colorant may be formed from dyes or pigments.

II. Highly Fluorinated Additives

The first aspect of the present invention is directed to a method for inducing and enhancing the threshold voltage and also improving the temperature latitude or temperature stability of threshold characteristics of an electrophoretic display, which method comprises adding one or more highly fluorinated additives into an electrophoretic dispersion which comprises electrophoretic particles dispersed in a dielectric solvent or solvent mixture. The highly fluorinated additive comprises at least one functional moiety capable of forming hydrogen bonding, acid-base interaction, donor-acceptor interaction, metal-ligand interaction or Coulombic interaction with the functional group(s) on the surface of particles, electrodes or electrode protection layers. The functional moiety is selected from the group consisting of oxy, carboxyl, amide, urea, urethane and the like. The functional group may be at the end of a main chain or a pendant side chain. Functional moieties without any labile or acidic hydrogens are preferred, particularly when the electrophoretic particles are positively charged. Surface active additives that are capable of improving the colloid stability of the electrophoretic dispersion are particularly preferred.

The highly fluorinated additive may be soluble or dispersible in an electrophoretic dispersion.

Preferably, the additive comprises more than 20% by weight, more preferably more than 30% by weight and most preferably more than 50% by weight, of fluorine. In one embodiment, the additive is a derivative of a perfluoropolyether or hydrofluoropolyether.

Suitable molecular weight of the additives is from about 200 to about 5,000,000, preferably from about 300 to about 100,000 and more preferably from about 500 to about 50,000.

The highly fluorinated additives are especially useful when a fluorinated dielectric solvent is used in an electrophoretic dispersion.

Specific additives may be represented by the following Formulas (A-1), (A-2), (B-1), (B-2) and (B-3):

(A-1)

(A-2)

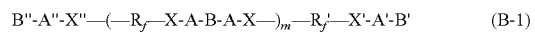

(B-1)

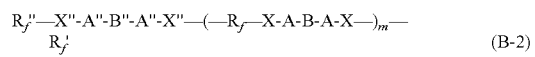

(B-2)

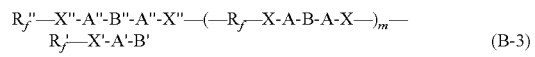

(B-3)

wherein:

n is an integer which is ≧1, preferably 1-4;

m is 0 or an integer which is ≧1, preferably 0-5;

$R_f$, $R_f'$ and $R_f''$ are independently a fluorinated moiety such as fluorinated alkyl, fluorinated aryl, fluorinated-arylalkyl, aryl-fluorinated alkyl, fluorinated-alkylaryl, alkyl-fluorinated aryl or a fluorinated polymeric or oligomeric chain;

X, X' and X'' are independently absent or a linking group such as alkylene, arylene, alkylene-oxy or alkylene-$NR^1$— wherein $R^1$ is hydrogen or alkyl;

A, A' and A'' are independently oxy (—O—), carboxyl [—C(O)O— or —O(O)C—], amide [—C(O)$NR^2$— or —$R^2$NC(O)—], urea [—$R^2$NC(O)$NR^3$—] or urethane [—$R^2$NC(O)O— or —OC(O)$NR^2$—] wherein $R^2$ and $R^3$ are independently hydrogen or alkyl;

B, B' and B'' are independently hydrogen, N≡, optionally substituted alkyl, optionally substituted aryl, optionally substituted heteroalkyl or optionally substituted heteroaryl; and N and $R^2$ in an amide moiety of A may form a cyclic moiety with B; N and $R^3$ in an urea moiety of A may form a cyclic moiety with B; or N and $R^2$ in an urethane moiety of A may form a cyclic moiety with B.

$R_f$, $R_f'$ and $R_f''$ may be independently monovalent, divalent or multivalent. For example, in Formula (A-1), $R_f$ may be n-valent; in Formula (A-2), $R_f$ is divalent; in Formula (B-1), both $R_f$ and $R_f'$ are divalent; in Formula (B-2), $R_f$ is divalent and both $R_f'$ and $R_f''$ are monovalent; and in Formula (B-3), both $R_f$ and $R_f'$ are divalent and $R_f''$ is monovalent.

A, A' and A'' are all divalent.

X, X' and X'', if present, are all divalent.

B, B' and B'' may be independently monovalent, divalent or multivalent. For example, in Formula (A-1), B is monovalent; in Formula (A-2), B is n-valent and B' is monovalent; in Formula (B-1), B is divalent and both B' and B'' are monovalent; in Formula (B-2), both B and B'' are divalent; and in Formula (B-3), both B and B'' are divalent and B' is monovalent.

The valency of a moiety in any of the five formulas would depend on the position of the moiety in a particular chain and the determination of the valency of each moiety would be obvious to a person skilled in the art.

It should also be noted that when m or n is greater than 1, the multiple units may be identical or different. For example, in Formula (A-1) when n is 2, the two units of —(—X-A-B) are identical or different and when n is 3, the three units of —(—X-A-B) are identical; or two of the three units are identical and the third is different; or all three units are different. This also applies to Formulas (A-2), (B-1), (B-2) and (B-3). It is understood that all of these variations are within the scope of the present invention.

In the context of $R_f$, $R_f'$ and $R_f''$, the alkyl group is as defined above but preferably having 3-40 carbon atoms and the aryl group is as defined above but preferably having 6-18 carbon atoms.

When $R_f$, $R_f'$ or $R_f''$ is a fluorinated polymeric or oligomeric chain, it may be prepared by addition polymerization, condensation polymerization or ring-opening polymerization. Suitable monomers for the preparation of $R_f$, $R_f'$ or $R_f''$ by addition polymerization may include, but are not limited to, acrylates, methacrylates, styrenes, vinyls such as vinylfluoride, vinylidene fluoride, tetrafluoroethylene or chlorotrifluoroethylene and halogenated, preferably fluorinated, derivatives thereof. Suitable monomers for condensation polymerization include, but are not limited to, diesters, dicarboxylic acids and acid chlorides, acid anhydrides, diols, diamines, diisocyanates and halogenated, preferably fluorinated, derivatives thereof. Suitable monomers for ring opening polymerization include, but are not limited to, oxiranes and cyclic ethers such as ethylene oxide, propylene oxide, tetrahydrofuran, aldehydes such as trifluoroacetaldehyde and halogenated, preferably fluorinated, derivatives thereof.

The average molecular weight (MW) of $R_f$, $R_f'$ or $R_f''$ may be in the range of about 200 to about 5,000,000, preferably from about 300 to about 100,000 and more preferably from about 500 to about 50,000.

The polymeric or oligomeric chain may be a homopolymer, a random copolymer, a block copolymer or a grafted or comb type of copolymer.

In one of the preferred embodiments, the $R_f$, $R_f'$ or $R_f''$ in Formulas (A-1), (A-2) )(B-1), (B-2) and (B-3) may be represented by Formula ($R_f$) below:

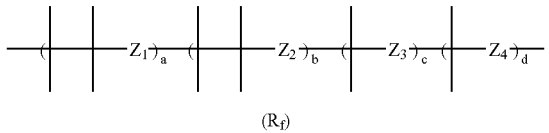

($R_f$)

wherein the open substituent positions (not designated) on the main chain can be the same or different and may independently be selected from the group consisting of hydrogen, halogen (especially fluoro), alkyl, aryl, alkylaryl, arylalkyl, fluoroalkyl, fluoroaryl, fluoro-alkylaryl, alkylfluoro-aryl, fluoro-arylalkyl, arylfluoro-alkyl, —$OR^4$, —$OC(O)R^4$, —$C(O)OR^4$, —$C(O)NR^4R^5$ (wherein $R^4$ and $R^5$ are independently hydrogen, alkyl, aryl, alkylaryl, arylalkyl, fluoroalkyl, fluoroaryl, fluoro-alkylaryl, alkylfluoroaryl, fluoro-arylalkyl, arylfluoro-alkyl or a fluorinated polyether) and derivatives thereof;

$Z_1$, $Z_2$, $Z_3$ and $Z_4$ are independently oxygen or absent; and a, b, c and d are independently from 0 to 500, preferably from 0 to 100, and the sum of a+b+c+d is from 3 to 1000, preferably from 5 to 500.

It is preferable that the $R_f$, $R_f'$ or $R_f''$ group does not comprise a functional group capable of interfering the hydrogen bonding, acid-base interaction or interfacial interaction between the particle surface and the additive(s).

In one embodiment, a and d are 0, $Z_2$ is oxygen and $Z_3$ is absent in Formula ($R_f$) which is referred to as $R_f$-1, hereinafter in this application.

In another embodiment, a is 0, $Z_2$ and $Z_3$ are oxygen and $Z_4$ is absent in Formula ($R_f$) which is referred to as $R_f$-2, hereinafter in this application.

The alkyl group referred to in $R_f$-1 and $R_f$-2, preferably has 1-20 carbon atoms and the aryl group preferably has 6-18 carbon atoms. It is also noted that the open substituent positions in $R_f$-1 and $R_f$-2 may be independently a fluorine or a fluorinated alkyl, especially a fluorinated methyl.

For an additive of Formula (A-1) wherein n is 1, —[—X-A-B] may be attached to any one of the open substituent positions of Formula ($R_f$). When n is greater than 1, —[—X-A-B] may be attached to #n of the open substituent positions of Formula ($R_f$). For example, when n is 3, then there will be 3 units of —[—X-A-B] each of which is attached to one of three open substituent positions of Formula ($R_f$).

The more preferred $R_f$-1, may be expressed as, but are not limited to, —$(C_3F_6O)_y CF(CF_3)$— (wherein y is 1-500, preferably 1-100). The more preferred $R_f$-2 may be expressed as, but are not limited to, —$CF_2O(CF_2CF_2O)_y(CF_2O)_zCF_2$— (wherein y and z are independently 1-500, preferably 1-100).

In another embodiment of Formula ($R_f$), c and d are 0, $Z_1$, is oxygen and $Z_2$ is absent. In this embodiment, Formula ($R_f$) may be —$(C_3F_6O)_yCF_2CF_2$— wherein y is 1-500.

Preferably, X, X' and X", in the context of the present invention, are independently absent or alkylene.

In one embodiment, the additive is Formula (A-1) wherein n is 1, X is absent, A is —COO— and B is hydrogen. In this embodiment, $R_f$ may be $R_f$-1.

In another embodiment, the additive is Formula (A-1) wherein n is 1, X is absent, A is amide and B is a heteroarylalkyl, preferably pyridinylalkyl. In this embodiment, $R_f$ may be $R_f$-1.

In a further embodiment, the additive is Formula (A-1) wherein n is 2, X is absent or alkylene, A is amide —C(O)NR²— wherein R² is hydrogen or alkyl, preferably alkyl. In one subset of this embodiment, B is an alkyl, preferably a linear or branched alkyl of 1-10 carbon atoms. In another subset of this embodiment, B is a substituted alkyl, preferably hydroxyl- or aryl-substituted alkyl and the aryl itself may be optionally substituted, for example, with a hydroxyl group. In a further subset of this embodiment, B is a heteroarylalkyl. In yet a further subset of this embodiment, B is a cyclic alkyl of 3-8 carbon atoms. In yet a further subset of this embodiment, B with N and R² in the amide moiety may form a heterocyclic moiety having 4-8 members.

In another embodiment, the additive is Formula (A-1) wherein A is urea [—R²NC(O)NR³—] or urethane [—OC(O)NR²—] wherein R² and R³ are independently hydrogen or alkyl. In one of the embodiments, one of R² and R³ in the urea moiety is hydrogen and the other is alkyl or both R² and R³ are alkyl. In another embodiment, R² in the urethane moiety is alkyl. In one subset of this embodiment, B is an aryl optionally substituted with one or more substituents selected from the group consisting of alkyl and R*OC(O)NH— wherein R* is optionally substituted alkyl or optionally substituted polyether, preferably hydroxyl substituted alkyl or hydroxyl substituted hydrofluoropolyether. In another subset of this embodiment, B is an alkyl comprising a cyclic alkyl moiety in which the cyclic alkyl moiety may be optionally substituted with one or more substituents selected from the group consisting of alkyl, —NCO and R*OC(O)NH— wherein R* is optionally substituted alkyl or optionally substituted polyether, preferably hydroxyl substituted alkyl or hydroxyl substituted hydrofluoropolyether.

In one embodiment, the additive is (A-2) wherein n is 2 or 3, preferably 3, B is N≡, an alkyl or a heteroalkyl, A and A' are independently amide, urea, carboxyl or urethane, X and X' are independently absent or alkylene and B' is an optionally substituted alkyl or optionally substituted aryl.

For an additive of Formula (A-2) wherein n is 1, -(-A-X—$R_f$—X'-A'-B') may be attached to one substitution site of B. When n is greater than 1, -(-A-X—$R_f$—X'-A'-B') may be attached to #n substitution sites of B. For example, when n is 3, then there will be 3 units of -(-A-X—$R_f$—X'-A'-B') each of which is attached to one of three substitution sites of B.

In another embodiment, the additive is Formula (B-1) wherein m is 1 or 2, X, X' and X" are independently absent or alkylene, A, A' and A" are independently amide, urea or urethane and B, B' and B" are independently an optionally substituted alkyl or optionally substituted aryl.

The functional additive may be present in an electrophoretic dispersion in the amount of from about 0.1% to about 30% by weight and preferably from about 0.5% to about 10% by weight, based upon the total dry weight of electrophoretic particles.

The additives of Formulas (A-1), (A-2), (B-1), (B-2) and (B-3) having a high surface activity in a halogenated, particularly fluorinated, dielectric solvent are especially preferred. It is believed that the degree of threshold enhancement and improvement in the temperature latitude of the threshold characteristics are largely determined by the ability of the additive of Formula (A-1), (A-2), (B-1), (B-2) or (B-3) to efficiently adsorb or chemically bond onto the surface of the electrophoretic particles and form reasonably strong interaction within a reasonable time scale with electrodes or the functional group(s) on the surface of particles or the electrode protection layer(s).

An additive that carries a charge of polarity opposite to that of the electrophoretic particles is preferred, particularly if its charge density or degree of charge separation is significantly less sensitive to an applied voltage than that of the electrophoretic particles. More preferably the additive is surface active with a high adsorption efficiency on the electrophoretic particles to widen the temperature latitude of the threshold characteristics.

The additive of Formulas (A-1), (A-2), (B-1), (B-2) and (B-3) may be synthesized by methods known in the art. Specific examples are given in the examples below. Briefly, the additives having $R_f$, $R_f'$ or $R_f''$ being $R_f$-1 may be prepared from Krytox® having the formula of $F(C_3F_6O)_yCF(CF_3)COOH$ or a Krytox® ester having the formula of $F(C_3F_6O)_yCF(CF_3)COO$ alkyl (available from DuPont) and the additives having $R_f$, $R_f'$ or $R_f''$ being $R_f$-2 may be prepared from Fluorolink D having the formula of $HOH_2CCF_2O(CF_2CF_2O)_y(CF_2O)_2CF_2CH_2OH$ (available from Solvay Solexis) or from Fluorolink L having the formula of $H_3CO(O)CCF_2O(CF_2CF_2O)_y(CF_2O)_2CF_2C(O)OCH_3$ (also available from Solvay Solexis). The synthesis of these additives preferably involves the formation of the functional moiety A. For example, an additive having A being an amide moiety, —C(O)NR²—, may be formed by reacting a moiety having an ester functional group with another moiety having an amino functional group, and an additive having A being an urethane moiety, —OC(O)NR²—, may be formed by reacting a moiety having a primary alcohol moiety with another moiety having an isocyanate functional group. The synthesis may also involve the modification of B by methods known in the art.

Additional information on synthetic methods may be found in U.S. Pat. Nos. 4,085,137, 4,094,911, 6,187,954, 6,162,521, 6,084,057, Caporiccio et al., "Low Temperature Elastomeric Polyamides containing Perfluorinated Polyether Building Blocks", Makromol. Chem., 184, 935-947 (1983), Malik et al., "Synthesis of Fluorinated Diisocyanates", J. Org. Chem., 56, 3043-3044 (1991), Journal of Polymer Science, Part A: Polymer Chemistry, Vol. 37, 557-570 (1999), Vol. 38, 2579-2602 (2000) & Vol. 40, 3771-3795 (2002), Tonelli et al., "Perfluoropolyether Functional Oligomers: Unusual Reactivity in Organic Chemistry", Journal of Fluorine Chemistry, 118, 107-121 (2002) and WO03/57360 (U.S. Ser. No. 10/335,051 filed Dec. 31, 2002).

Additives that do not have a labile hydrogen for hydrogen bonding or donor-acceptor interaction are preferred, particularly when the electrophoretic particles carry a positive charge. Additives that do not have a labile hydrogen are those having a functional moiety A such as amide [—C(O)NR²— or —R²NC(O)—], urea [—R²NC(O)NR³—] or urethane [—R²NC(O)O— or —OC(O)NR²—] wherein R² and R³ are not hydrogen and B does not comprise any labile hydrogens.

The second aspect of the invention is directed to an electrophoretic dispersion comprising electrophoretic particles, preferably pigment-containing microparticles, dispersed in a dielectric solvent or solvent mixture and one or more functional additives of the present invention.

The third aspect of the invention is directed to an electrophoretic display comprising display cells filled with an electrophoretic dispersion comprising electrophoretic particles dispersed in a dielectric solvent or solvent mixture and one or more functional additives of the present invention.

The display referred to in this application may be an electrophoretic display prepared by the microcup technology as described in WO01/67170 or an electrophoretic display prepared by a microencapsulation process as described in U.S. Pat. Nos. 5,961,804 and 5,930,026 or a copending application, U.S. Ser. No. 60/443,893 filed on Jan. 30, 2003.

The electrophoretic microparticles without a pigment contained therein prepared from the second aspect of the invention are particularly useful for an electrophoretic display driven by the TIR switching mode as described in M. A. Mossman, et al, SID 01 Digest pp. 1054 (2001); SID IDRC proceedings, pp. 311 (2001) and SID'02 Digest, pp. 522 (2002). In the display with the TIR switching mode, the reflection of light is modulated by moving the microparticles into optical contact with the prismatic reflector surface.

The display may also have the traditional up/down switching mode, the in-plane switching mode or the dual switching mode. If the displays are driven by the traditional up/down switching mode or the dual switching mode, both the top and bottom layers are electrode plates, and at least one of which is transparent and the cells are enclosed between the two electrode plates. The up/down mode allows the electrophoretic particles to move in the vertical (up/down) direction whereas the dual switching mode allows the electrophoretic particles to move in both the vertical (up/down) direction or the planar (left/right) direction. In the display having the in-plane switching mode, the cells are sandwiched between an insulator layer and an electrode plate. The in-plane switching mode allows the electrophoretic particles to move in the planar direction only.

EXAMPLES

Preparation 1 Synthesis of R$_f$-pyridine

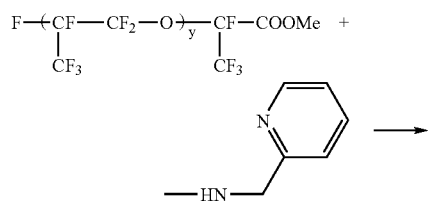

-continued

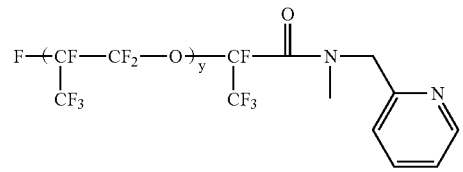

The additive is Formula (A-1) wherein n is 1, R$_f$ is R$_f$-1, X is absent, A is amide and B is a heteroarylalkyl.

6.1 Gm of N-methyl-2-aminomethylpyridine was dissolved in 30 ml of 1,1,2-trichlorotrifluoroethane (from Aldrich) and 5 ml of α,α,α-trifluorotoluene (from Aldrich). A solution containing 19 gm of krytox methyl ester (MW=1900, from DuPont) and 30 ml of trichlorotrifluoroethane was added dropwise under stirring over 15 minutes. The reaction mixture was stirred for four hours before the solvent was evaporated. The reaction mixture was then kept in a 65° C. water bath under vacuum till IR showed the complete disappearance of C=O vibration for methyl ester at 1780 cm$^{-1}$. The crude product was dissolved in 100 ml of PFS2 (from Solvay) and extracted by 50 ml of ethyl acetate three times. The PFS2 phase was evaporated to yield 16 gm of a pale yellow oil.

Preparation 2: Synthesis of Intermediates

Preparation 2.1: Synthesis of Perfluoro Ethylether Methylether Diallyl Ether

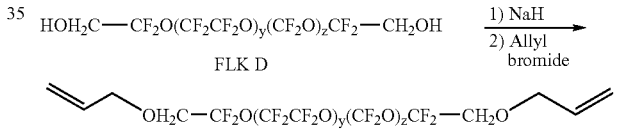

To a solution of Fluorolink D (80 gm) (perfluoro ethylether methylether diol, from Solvay Solexis, MW=2000) in the mixture of THF-ENFB-PFS2 (100 ml-150 ml-150 ml) was slowly added NaH (4.2 gm) in 4 portions at room temperature. The mixture was heated at reflux for 4 hours. Allyl bromide (16 ml) was then added and the mixture was kept under reflux overnight. Another 8 ml of allyl bromide was subsequently added and the mixture was refluxed for another 6 hours. The mixture was cooled down and acidified with 1N HCl$_{(aq)}$. PFS2 was then added and the perfluorinated phase was washed with water two times followed by acetone two times. The PFS2 phase was then dried over Na$_2$SO$_4$ and in vacuo to yield the product (ca. 80 gm) which was used in Preparation 2.2.

Preparation 2.2: Synthesis of D2POH

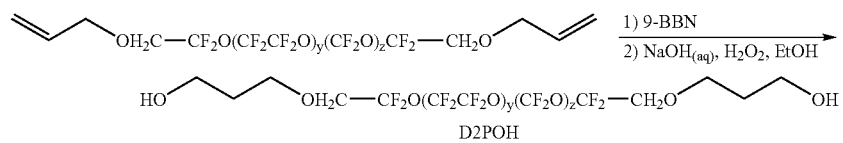

To a solution of diallyl ether (ca. 80 gm) prepared in Preparation 2.1 in 100 ml of ENFB (1-ethoxynonafluorobutane) at 0° C. was added 9-BBN (9-borabicyclo[3.3.1]nonane) (500 ml, 0.5M in THF) over 1 hour. The mixture was allowed to warm to room temperature and stirred overnight. To this mixture was slowly added ethanol (50 ml), 6N NaOH (60 ml) and then 30% hydrogen peroxide (100 ml). The mixture was then heated under reflux for 4 hours. The mixture was cooled down and acidified with 1N $HCl_{(aq)}$ and extracted with PFS2 two times. The PFS2 phase was washed with acetone two times and then dried over $Na_2SO_4$ and in vacuo to yield 65 gm of the product.

Preparation 2.3: Synthesis of Perfluoro Ethylether Ethylether Diisocyanate

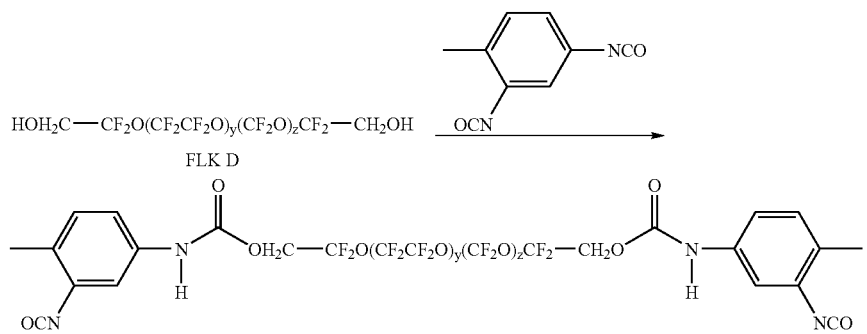

To a solution of tolylene 2,4-diisocyanate (21 gm) and dibutyltin dilaurate (300 mg) in 50 ml of ethyl acetate at reflux was added a solution of Fluorolink D (25 gm) (perfluoro ethylether methylether diol, from Solvay Solexis, MW=2000) in 55 ml of 1,1,2-trichlorotrifluoroethane over 1 hour. The mixture was kept under reflux for 20 hours. The crude product was dissolved in the PFS2 solvent and washed with ethyl acetate four times. The PFS2 phase was then dried over $Na_2SO_4$ and in vacuo to yield 9 gm of the product.

Preparation 3

Preparations 3.1-3.2 demonstrate the preparation of additives of Formula (A-1).

The additive is a Formula (A-1) wherein n is 2, $R_f$ is $R_f$-2, X is —$CH_2$—, A is urethane and B is a substituted phenyl.

Preparation 3.1: Synthesis of D2TEG

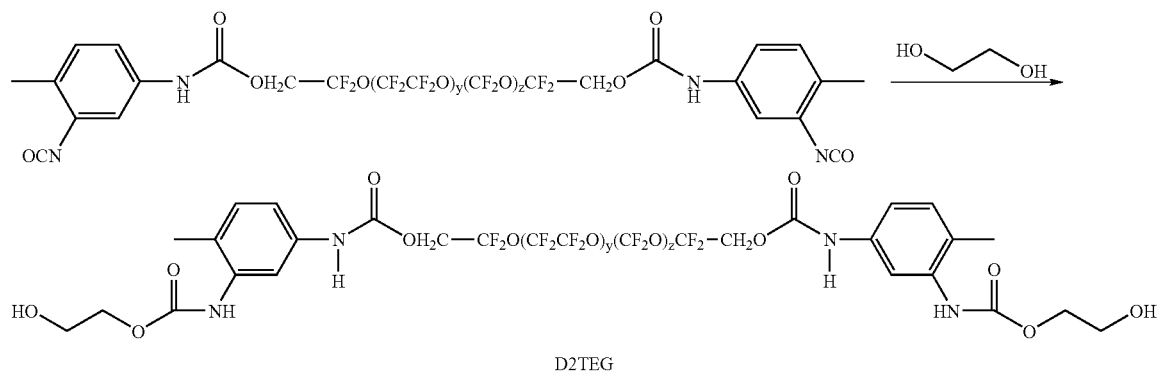

D2TEG

To a solution of ethylene glycol (6.07 gm) and dibutyltin dilaurate in 2% acetone (1.5 gm) in 55 ml of acetone at reflux was added a solution of perfluoro ethylether methylether diisocyanate of Preparation 2.3 (9 gm) in 40 ml of 1,1,2-trichlorotrifluoroethane over 1 hour. The mixture was kept under reflux for 40 hours. The solvent was removed by rotary evaporator. The crude product was dissolved in the PFS2 solvent and washed with ethyl acetate/methanol (1:1) once and ethyl acetate/acetone (1:1) once. The PFS2 phase was then dried over $Na_2SO_4$ and in vacuo to yield 1.8 gm of the product.

Preparation 3.2: Synthesis of Perfluoro Ethylether Methylether Diisocyanate

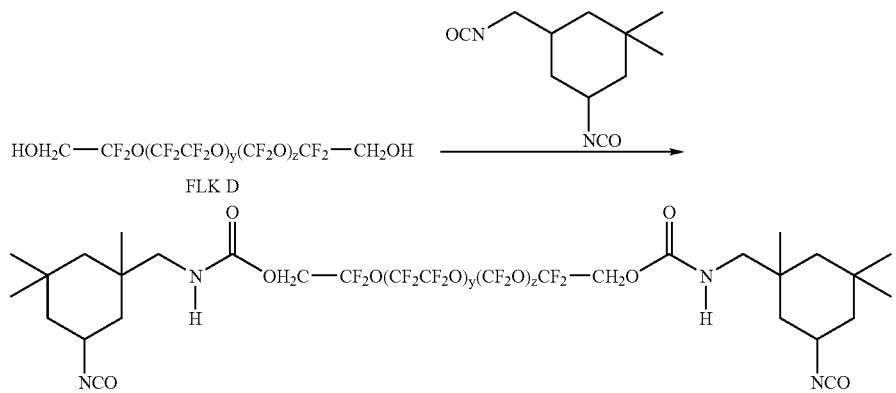

The additive is a Formula (A-1) wherein n is 2, $R_f$ is $R_f$-2, X is —$CH_2$—, A is urethane and B is an alkyl comprising a substituted cycloalkyl.

To a solution of isophorone diisocyanate (58 gm) and dibutyltin dilaurate (400 mg) in 100 ml of 1,1,2-trichlorotrifluoroethane at reflux was added a solution of Fluorolink D (45 gm) (perfluoro ethylether methylether diol, from Solvay Solexis, MW=2000) in 10 ml of 1,1,2-trichlorotrifluoroethane over 1 hour. The mixture was kept under reflux for 22 hours. Solvent was removed using Dean-Stark apparatus. The crude product was dissolved in the PFS2 solvent and washed with ethyl acetate four times. The PFS2 phase was then dried over $Na_2SO_4$ and in vacuo to yield 16.2 gm of the product.

Preparation 4

Preparations 4.1-4.9 below demonstrate the preparation of the additives of Formula (A-1).

Preparation 4.1: Synthesis of L2EA

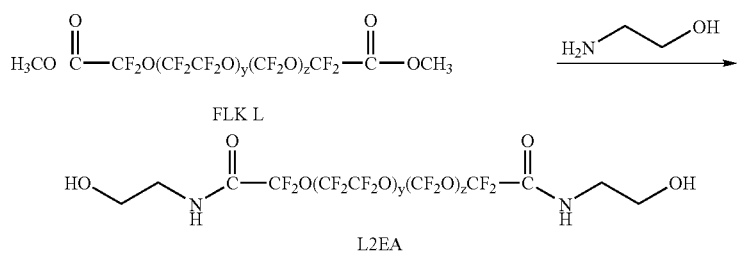

L2EA

The additive is Formula (A-1) wherein n is 2, $R_f$ is $R_f$-2, X is absent, A is amide and B is a substituted alkyl.

To a solution of ethanolamine (6.1 gm) in a 1,1,2-trichlorotrifluoroethane-isopropanol (25 ml-25 ml) mixture at room temperature was added a solution of Fluorolink L (22.5 gm) (perfluoro ethylether methylether dimethyl ester, from Solvay Solexis, MW=2000) in 50 ml of 1,1,2-trichlorotrifluoroethane over 1 hour. The mixture was then stirred at room temperature for 20 hours. The solvent was removed by rotary evaporator. The crude product was dissolved in the PFS2 solvent and washed with ethyl acetate/methanol (1:1) once, ethyl acetate/methanol (2:1) once and ethyl acetate two times. The PFS2 phase was then dried over $Na_2SO_4$ and in vacuo to yield 7.5 gm of the product.

Preparation 4.2: Synthesis of L2TYA

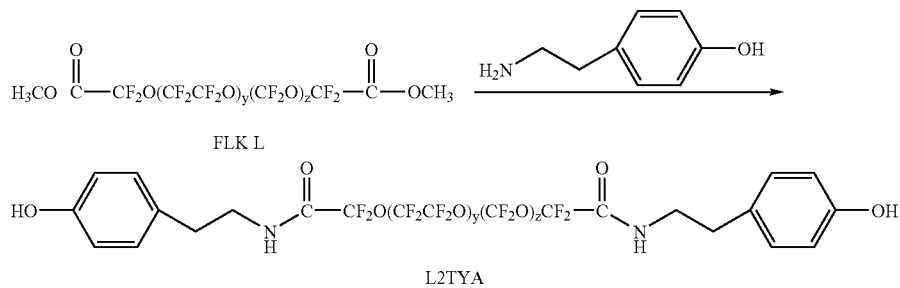

The additive is Formula (A-1) wherein n is 2, $R_f$ is $R_f$-2, X is absent, A is amide and B is a substituted arylalkyl.

The mixture of Fluorolink L (11.25 gm) (perfluoro ethylether methylether dimethyl ester, from Solvay Solexis, MW=2000) and tyramine (6.86 gm) in 50 ml of 1,1,2-trichlorotrifluoroethane and 100 ml of methanol was heated to 50° C. for 10 minutes and then stirred at room temperature for 42 hours. The solvent was removed by rotary evaporator. The crude product was dissolved in the PFS2 solvent and washed with acetone/methanol (1:1) once, ethyl acetate/methanol (1:1) once and ethyl acetate once. The PFS2 phase was then dried over $Na_2SO_4$ and in vacuo to yield 0.54 gm of the product.

Preparation 4.3: Synthesis of L2MEA

The additive is Formula (A-1) wherein n is 2, $R_f$ is $R_f$-2, X is absent, A is amide and B is a substituted alkyl.

The mixture of Fluorolink L (30 gm) (perfluoro ethylether methylether dimethyl ester, from Solvay Solexis, MW=2000) and 2-(methylamino)ethanol (22.8 gm) was stirred at room temperature for 48 hours and then at 35° C. under vacuum for 3 hours. The crude product was dissolved in the PFS2 solvent and washed with ethyl acetate/acetone (1:1) two times and ethyl acetate two times. The PFS2 phase was then dried over $Na_2SO_4$ and in vacuo to yield 16.0 gm of the product.

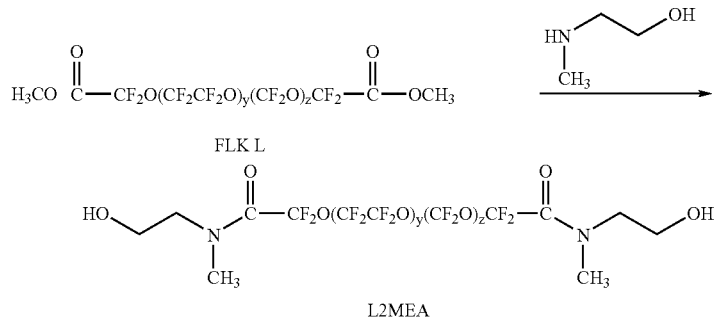

Preparation 4.4: Synthesis of L2HPA

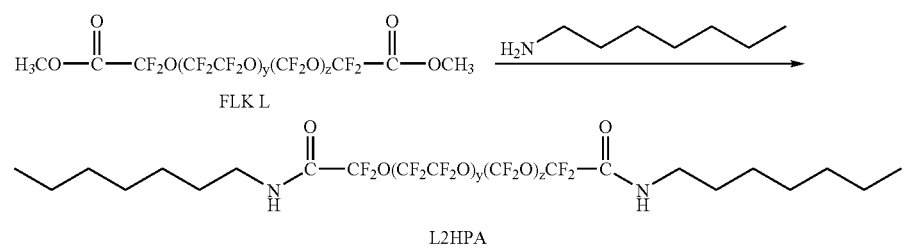

The additive is Formula (A-1) wherein n is 2, $R_f$ is $R_f$-2, X is absent, A is amide and B is an alkyl.

The mixture of Fluorolink L (15.66 gm) (perfluoro ethylether methylether dimethyl ester, from Solvay Solexis, MW=2000) and 1-heptylamine (6.44 gm) in 20 ml of 1,1,2-trichlorotrifluoroethane was stirred at room temperature for 14 hours. The solvent was removed by rotary evaporator. The crude product was dissolved in the PFS2 solvent and washed with ethyl acetate/methanol (1:1) two times and ethyl acetate two times. The PFS2 phase was then dried over $Na_2SO_4$ and in vacuo to yield 9.3 gm of the product.

Preparation 4.5: Synthesis of L2BuA

The additive is Formula (A-1) wherein n is 2, $R_f$ is $R_f$-2, X is absent, A is amide and B is an alkyl.

The mixture of Fluorolink L (11.25 gm) (perfluoro ethylether methylether dimethyl ester, from Solvay Solexis, MW=2000) and ethylamine (20 ml of 2.0 M in methanol) in 20 ml of ENFB was stirred at room temperature for 22 hours. The solvent was removed by rotary evaporator. The crude product was dissolved in the PFS2 solvent and washed with ethyl acetate/methanol (1:1) two times and ethyl acetate two times. The PFS2 phase was then dried over $Na_2SO_4$ and in vacuo to yield 7.58 gm of the product.

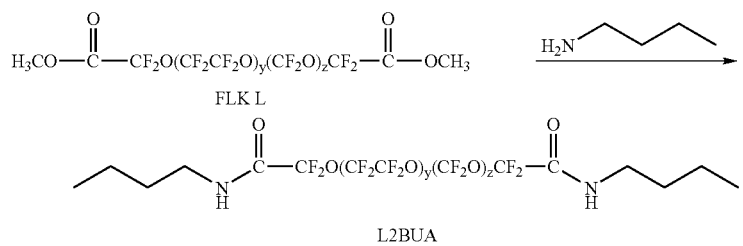

The additive is Formula (A-1) wherein n is 2, $R_f$ is $R_f$-2, X is absent, A is amide and B is an alkyl.

The mixture of Fluorolink L (15.1 gm) (perfluoro ethylether methylether dimethyl ester, from Solvay Solexis, MW=2000) and butylamine (5.3 gm) in 15 ml of 1,1,2-trichlorotrifluoroethane was stirred at room temperature for 16 hours. The solvent was removed by rotary evaporator. The crude product was dissolved in the PFS2 solvent and washed with ethyl acetate/methanol (1:1) two times and ethyl acetate two times. The PFS2 phase was then dried over $Na_2SO_4$ and in vacuo to yield 9.7 gm of the product.

Preparation 4.6: Synthesis of L2EtA

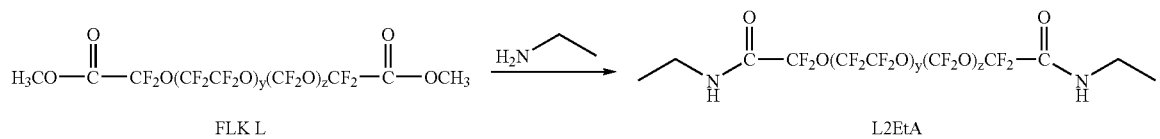

Preparation 4.7: Synthesis of L2ME

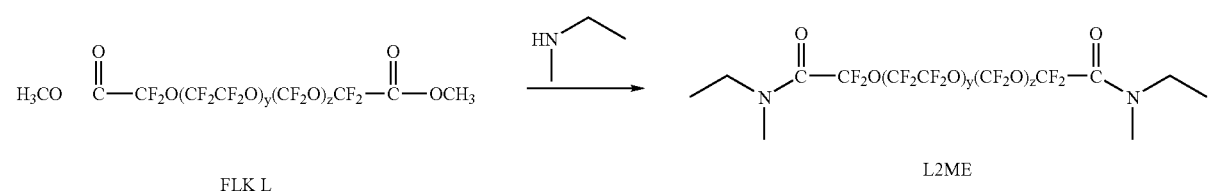

The additive is Formula (A-1) wherein n is 2, $R_f$ is $R_f$-2, X is absent, A is amide and B is an alkyl.

The mixture of Fluorolink L (19.65 gm) (perfluoro ethylether methylether dimethyl ester, from Solvay Solexis, MW=2000) and ethylmethylamine (11.8 gm) was stirred at room temperature for 48 hours. The excess of ethylmethylamine was removed by rotary evaporator. The crude product was dissolved in the PFS2 solvent and washed with ethyl acetate two times. The PFS2 phase was then dried over $Na_2SO_4$ and in vacuo to yield 15.01 gm of the product.

Preparation 4.8: Synthesis of L2MHA

The additive is Formula (A-1) wherein n is 2, $R_f$ is $R_f$-2, X is absent, A is amide and B is a cylcoalkyl.

The mixture of Fluorolink L (16.5 gm) (perfluoro ethylether methylether dimethyl ester, from Solvay Solexis, MW=2000) and cyclohexylamine (10.8 gm) was stirred at room temperature for 60 hours and then at 40° C. under vacuum for 2 hours. The crude product was dissolved in the PFS2 solvent and washed with ethyl acetate/acetone two times and ethyl acetate two times. The PFS2 phase was then dried over $Na_2SO_4$ and in vacuo to yield 10.2 gm of the product.

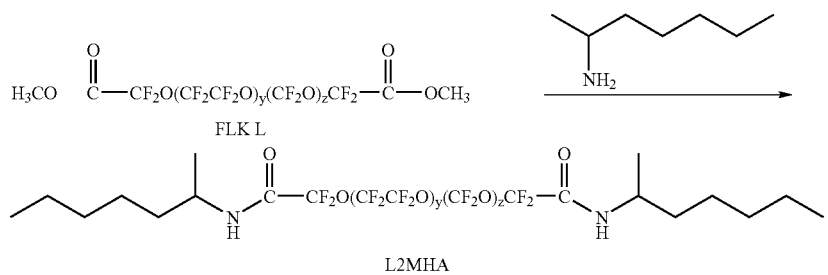

L2MHA

The additive is Formula (A-1) wherein n is 2, $R_f$ is $R_f$-2, X is absent, A is amide and B is an alkyl.

The mixture of Fluorolink L (22.0 gm) (perfluoro ethylether methylether dimethyl ester, from Solvay Solexis, MW=2000) and 2-aminoheptane (10.5 gm) was stirred at room temperature for 20 hours and then at 35° C. under vacuum for 1 hour. The crude product was dissolved in the PFS2 solvent and washed with ethyl acetate/methanol two times and ethyl acetate two times. The PFS2 phase was then dried over $Na_2SO_4$ and in vacuo to yield 13.9 gm of the product.

Preparation 4.9: Synthesis of L2CyA

Preparation 5

Preparations 5.1 and 5.2 below demonstrate the preparation of Formula (A-2).

Preparation 5.1: Synthesis of L2TSA

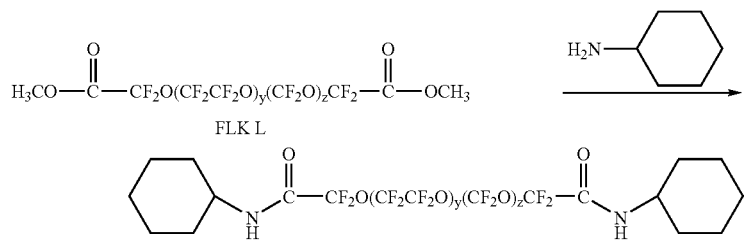

L2CyA

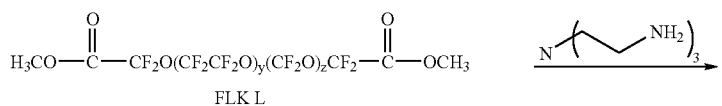

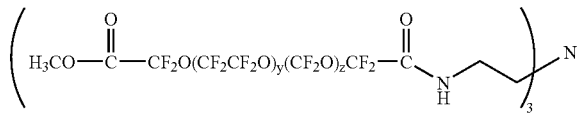

L2TSA

The additive is Formula (A-2) wherein n is 3, B is N≡, $R_f$ is $R_f$-2, A is amide, both X and X' are absent, A' is carboxyl and B' is an alkyl.

To a solution of Fluorolink L (70 gm) (perfluoro ethylether methylether dimethyl ester, from Solvay Solexis, MW=2000) in 30 ml of 1,1,2-trichlorotrifluoroethane at room temperature was added a solution of tris(2-aminoethyl) amine (0.5 gm) in 30 ml of ethyl acetate over 3 hours. The mixture was then stirred at room temperature for 24 hours. The solvent was removed by rotary evaporator. The crude product was heated to 60° C. The product was used for further reaction without any purification.

Preparation 5.2: Synthesis of L2T3EA

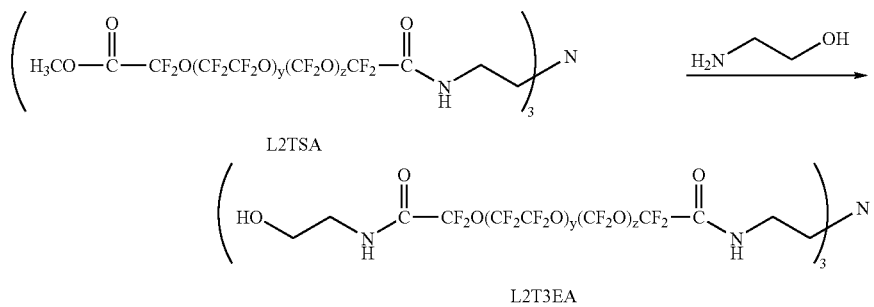

The additive is Formula (A-2) wherein n is 3, B is N≡, $R_f$ is $R_f$-2, A is amide, both X and X' are absent, A' is amide and B' is a substituted alkyl.

mixture of L2TSA from Preparation 5.1 (20.66 gm) and ethanolamine (5.1 gm) in 20 ml of 1,1,2-trichlorotrifluoroethane was stirred at room temperature for 20 hours. The solvent was removed by rotary evaporator. The crude product was dissolved in the PFS2 solvent and washed with acetone/methanol (1:1) once, ethyl acetate/methanol (2:1) once and ethyl acetate once. The PFS2 phase was then dried over $Na_2SO_4$ and in vacuo to yield 12.18 gm of the product.

Preparation 6

Preparation 6 below demonstrates the preparation of an additive of Formula (A-1).

Preparation 6: Synthesis of L2PiP

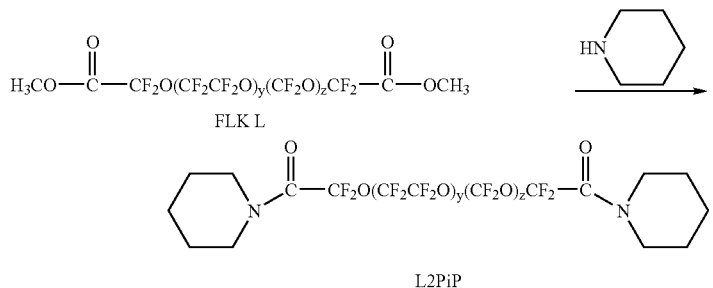

The additive is Formula (A-1) wherein n is 2, $R_f$ is $R_f$-2, X is absent, A is amide —C(O)$NR^2$— wherein N, $R^2$ and B form a heterocyclic moiety of 6 members.

A mixture of Fluorolink L (15.1 gm) (perfluoro ethylether methylether dimethyl ester, from Solvay Solexis, MW=2000) and piperidine (8.6 gm) was stirred at room temperature for 42 hours and then at 40° C. under vacuum for 2 hours. The crude product was dissolved in the PFS2 solvent and washed with ethyl acetate/acetone two times and ethyl acetate once. The PFS2 phase was then dried over Na₂SO₄ and in vacuo to yield 10.0 gm of the product.

The solvent was removed by rotary evaporator. The crude product was dissolved in the PFS2 solvent and washed with ethyl acetate two times. The PFS2 phase was then dried over Na₂SO₄ and in vacuo to yield 49 gm of the product.

Preparation 7

Preparations 7.1-7.3 below demonstrate the preparation of additive of Formula (B-1).

Preparation 7.1: Synthesis of DT2D

Preparation 7.2: Synthesis of D2TD

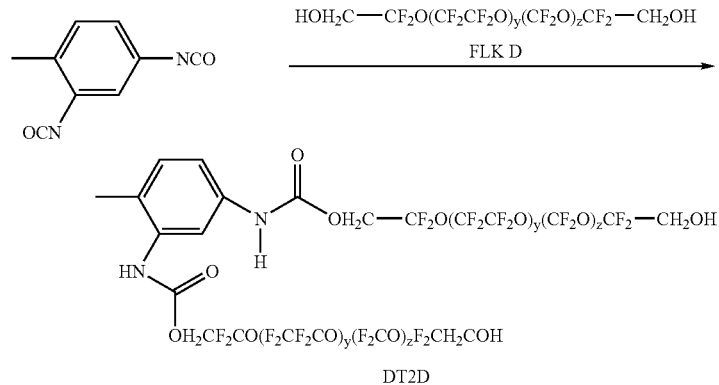

The additive is Formula (B-1) wherein m is 1, $R_f$ and $R'_f$ are $R_f$-2, both A' and A''' are oxy, both B' and B'' are hydrogen, X, X' and X'' are all methylene, A is urethane and B is a substituted aryl.

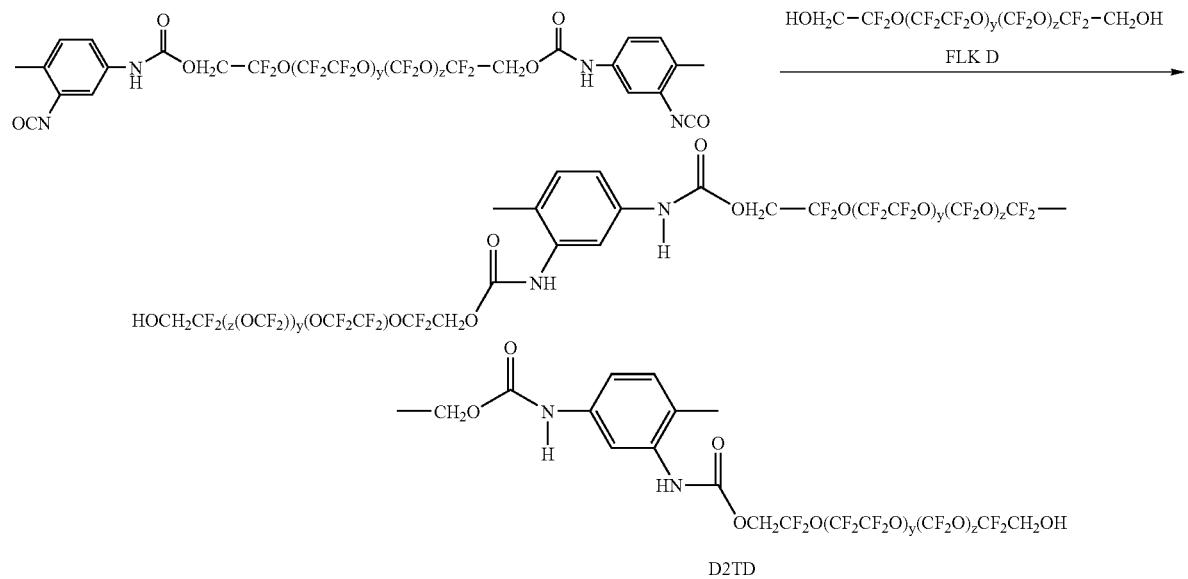

To a solution of Fluorolink D (54 gm) (perfluoro ethylether methylether diol, from Solvay Solexis, MW=2000) and dibutyltin dilaurate (200 mg) in 70 ml of 1,1,2-trichlorotrifluoroethane at reflux was added a solution of tolylene 2,4-diisocyanate (0.6 gm) in 30 ml of ethyl acetate over 20 minutes. The mixture was kept under reflux for 40 hours.

The additive is Formula (B-1) wherein m is 2, $R_f$ and $R'_f$ are $R_f$-2, both A' and A''' are oxy, both B' and B'' are hydrogen, X, X' and X'' are all methylene, A is urethane and B is a substituted aryl.

To a solution of Fluorolink D (14.5 gm) (perfluoro ethylether methylether diol, from Solvay Solexis, MW=2000)

and dibutyltin dilaurate (100 mg) in 25 ml of 1,1,2-trichlorotrifluoroethane at reflux was added a solution of perfluoro ethylether methylether diisocyanate (3 gm, from Preparation 2.3) in 35 ml of 1,1,2-trichlorotrifluoroethane over 30 minutes. The mixture was kept under reflux for 20 hours. The solvent was removed by rotary evaporator. The crude product was dissolved in the PFS2 solvent and washed with ethyl acetate two times. The PFS2 phase was then dried over $Na_2SO_4$ and in vacuo to yield 14.48 gm of the product.

Preparation 7.3: Synthesis of D21D

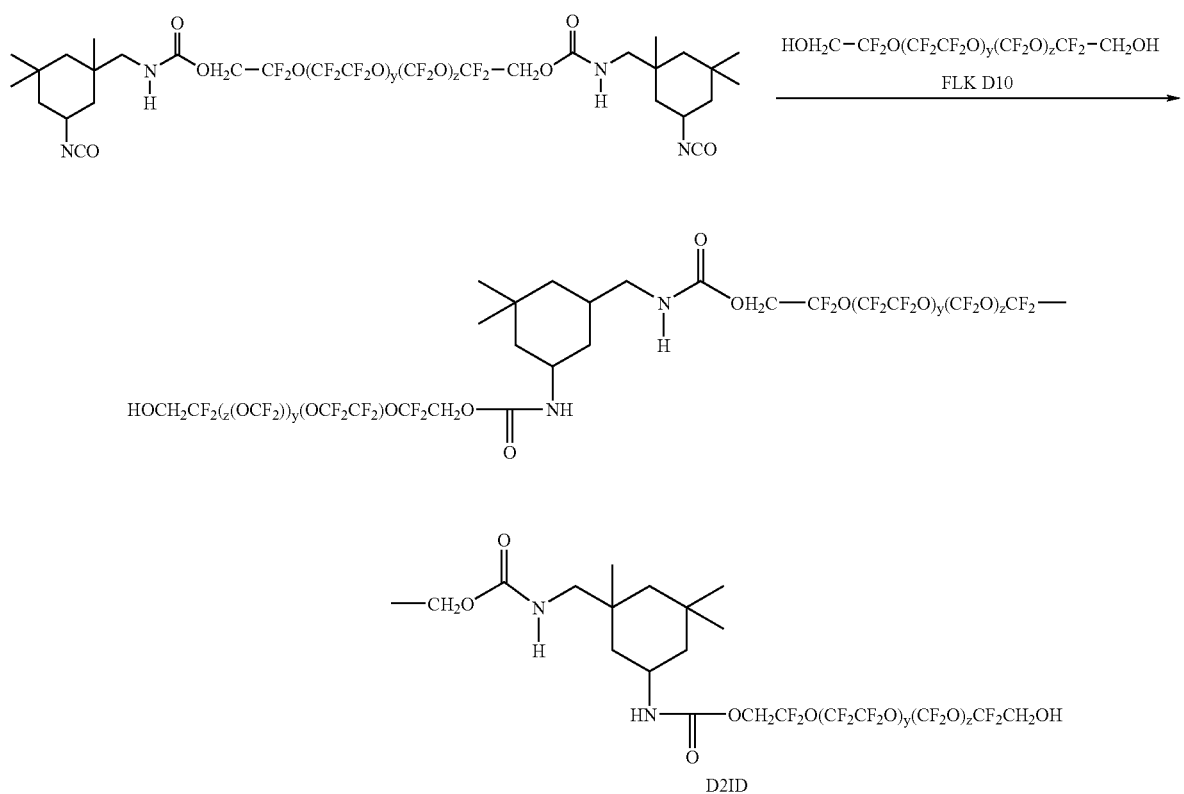

D21D

The additive is Formula (B-1) wherein m is 2, $R_f$ and $R'_f$ are $R_f$-2, both A' and A''' are oxy, both B' and B'' are hydrogen, X, X' and X'' are all methylene, A is urethane and B is an alkyl comprising a substituted cycloalkyl.

To a solution of Fluorolink D10 (38 gm) (perfluoro ethylether methylether diol, from Solvay Solexis, MW=1000) and dibutyltin dilaurate (120 mg) in 25 ml of 1,1,2-trichlorotrifluoroethane at reflux was added a solution of perfluoro ethylether methylether diisocyanate (11.5 gm, from Preparation 2.3) in 50 ml of 1,1,2-trichlorotrifluoroethane over 30 minutes. The mixture was kept under reflux for 20 hours. The solvent was removed by rotary evaporator. The crude product was dissolved in the PFS2 solvent and washed with ethyl acetate/methanol two times and ethyl acetate two times. The PFS2 phase was then dried over $Na_2SO_4$ and in vacuo to yield 19.2 gm of the product.

Preparation 8

Synthesis of Fluorinated Cu Phthalocyanine (CuPc) Dye

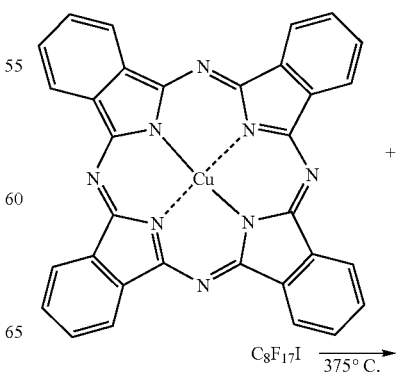

-continued

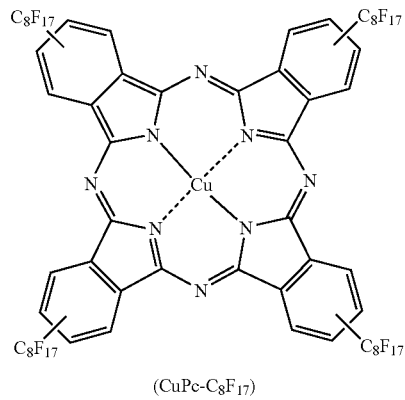

(CuPc-C8F17)

The fluorinated Cu phthalocyanine dye was prepared according to U.S. Pat. No. 3,281,426.

A mixture of 41 gm of copper phthalocyanine blue (Irgalite Blue BLPO, from Ciba Geigy) and 390 gm of 1-iodoperfluorooctane (from SynQuest) in a glass liner was loaded into a 1-gallon pressure reactor (from Parr Instrument). The reactor was sealed and heated to 60° C., then purged with argon and vacuumed at 60° C. After the purge and vacuum was repeated 5 times, the reactor was placed in the heater slot such that a thermal couple probe was in contact with the center of the reactor bottom. The reactor was then heated to 375° C. and held at 375° C. for 31 hours, then was cooled to room temperature. The crude product was extracted with Galden PFS-2 (from Solvay Solexis) in a Soxhlet extractor. The dark blue solution was washed with acetone several times until the acetone wash was colorless. The washed dark blue solution was filtered through 0.45 um filter under vacuum. The filtrate was concentrated at 60° C. under vacuum (about 60 Torr) to a slurry in a rotary evaporator. The slurry was dried under high vacuum, 0.5 to 1 Torr, at 60° C. overnight. The dried product was sublimed at 120° C. under high vacuum, 0.5 to 1 Torr, for 2 hours.

A dark blue solid was obtained.

Preparation 9

Preparation of F8POH

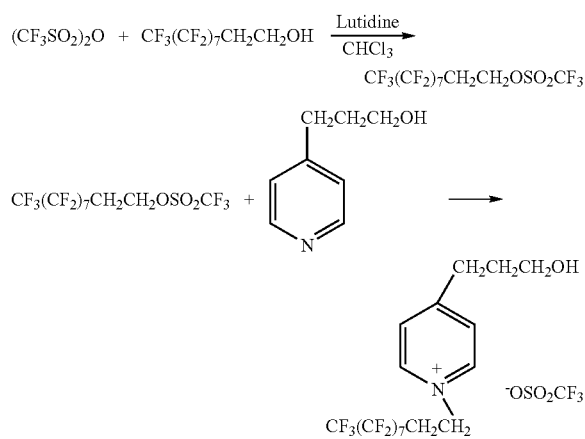

3.21 Gm (30.0 mmol) of 2,6-lutidine (Aldrich) and 11.6 gm (25.0 mmol) of 1H, 1H, 2H, 2H-perfluorodecanol [$CF_3(CF_2)_n CH_2 CH_2 OH$, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added dropwise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H, 1H, 2H, 2H-perfluorodecyl triflate, $CF_3(CF_2)_n CH_2 CH_2 OSO_2 CF_3$, n=7) was obtained.

5.96 Gm (10 mmol) of the thus obtained 1H, 1H, 2H, 2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(3,3,4,4,5,5,6,6,7,7,8,8,9,9,10,10-heptadecafluoro-decyl)-4-(3-hydroxy-propyl)-pyridinium trifluoro-methanesulfonate (n=7, hereinafter referred to as F8POH), was obtained.

Preparation 10

Preparation of $TiO_2$-Containing Microparticles (A)

8.93 Gm of Desmodur® N3400 aliphatic polyisocyanate (from Bayer AG) was dissolved in 5.78 gm of acetone (99.9%, from Burdick & Jackson) and homogenized for 10 seconds with a rotor-stator homogenizer (IKA ULTRA-TURRAX T25, IKA WORKS) at ambient temperature. To the resultant solution, 13.61 gm of $TiO_2$ (Ti-Pure®706, from DuPont) was added and homogenized for 2 minutes. To the resultant $TiO_2$ dispersion, a solution containing 1.42 gm of 1,5-pentanediol (BASF), 0.30 gm of triethanolamine (99%, Dow), 2.75 gm of polypropylene oxide (MW=725, from Aldrich), 0.2 gm of F8POH (prepared from Preparation 9), 0.08 gm of LiOTf (lithium trifluoromethanesulfonate, 97%, from Lancaster) and 1.25 gm of acetone was added and homogenized for 1 minute. 0.37 Gm of a 2% dibutyltin dilaurate (Aldrich) solution in acetone was then added and homogenized for 1 minute and 30 seconds.

In the final step, a solution containing 50.0 gm of HT200 (from Solvay Solexis) and 2.25 gm of $R_f$-amine4900 (a protective colloid $R_f$-amine prepared from according to WO03/57360) was added to the $TiO_2$/oligomer dispersion prepared above and homogenized for 4 minutes. The resultant microparticle dispersion was then heated at 80° C. and stirred under low shear to post cure the microparticles overnight.

The post-cured microparticle dispersion was filtered through a 30-μm Nylon net filter (Millipore) and the solid content of the filtered dispersion was measured by an IR-200 Moisture Analyzer (Denver Instrument Company). The filtered dispersion was used to prepare an electrophoretic dispersion.

Preparation 11

Preparation of $TiO_2$-Containing Microparticles (B)

9.50 Gm of Desmodur® N3400 aliphatic polyisocyanate (from Bayer AG) and 0.49 gm of TEA (triethanolamine from Dow) were dissolved in 3.79 gm of acetone. To the resultant solution, 13 gm of TiO$_2$ R706 (DuPont) was added and homogenized for 2 minutes and 30 seconds with a rotor-stator homogenizer (IKA ULTRA-TURRAX T25) at room temperature, to which a solution containing 1.67 gm of 1,5-pentanediol (BASF), 1.35 gm of polypropylene oxide (MW=725 from Aldrich), 0.45 gm of F8POH (from Preparation 9) and 2.47 gm of acetone was added and homogenized for 1 minute. To the resultant solution, 0.32 gm of an acetone solution containing 2% dibutyltin dilaurate (Aldrich) was added and homogenized for 2 minutes. Finally, 40.0 gm of a HT-200 (Solvay Solexis) solution containing 0.8 gm of R$_f$-amine4900 (prepared according to WO03/57360) was added and homogenized for 2 minutes, followed by addition of 33.0 gm of a HT-200 solution containing 0.6 gm of R$_f$-amine4900 and 0.35 gm of the perfluorinated Cu phthalocyanine dye CuPc-C$_8$F$_{17}$ (from Preparation 8) and homogenization for 2 minutes. The resultant microparticle dispersion was then heated at 80° C. overnight and stirred under low shear to post cure the particles.

The post-cured microparticle dispersion was filtered through a 30-μm Nylon net filter (Millipore) and the solid content of the filtered dispersion was measured by an IR-200 Moisture Analyzer (Denver Instrument Company). The filtered dispersion was used to prepare an electrophoretic dispersion.

Preparation 12

Preparation of Display Sample

A. Primer Coated Transparent Conductor Film

A primer coating solution containing 1.42 gm of Irostic® P9815 (polyurethane, Huntsman, Germany), 2.21 gm of CN983 (urethane diacrylate, Sartomer, Exton, Pa.), 1.10 gm of EB1290 (hexafunctional aliphatic urethane acrylate, UCB, Smyrna, Ga.), 0.13 gm of Irgacure™ 369 (2-benzyl-2-(dimethylamino)-1-[4-(4-morpholinyl)phenyl]-1-butanone, Ciba, Tarrytown, N.Y.), 0.13 gm of Sarcure SR1124 (isopropyl thioxanthone, Sartomer, Exton, Pa.), 0.03 gm of Irganox™ 1035 (thiodiethylene bis(3,5-di(tert)-butyl-4-hydroxyhydrocinnamate, Ciba Tarrytown, N.Y.), 80 gm of MEK (methyl ethyl ketone) and 15 gm of CHO (cyclohexanone) was mixed thoroughly and coated onto a 5 mil transparent conductor film (ITO/PET film, 5 mil OC50 from CPFilms, Martinsville, Va.) using a T#4 drawdown bar. The coated ITO film was dried in an oven at 65° C. for 10 minutes, and then exposed to 1.4 J/cm$^2$ of UV light under air using a UV conveyer (DDU, Los Angles, Calif.).

B. Preparation of Microcups

Microcup Composition

| Component | Weight Part | Source |
| --- | --- | --- |
| EB 600 | 35.927 | UCB |
| SR 399 | 34.941 | Sartomer |
| HDDA | 22.337 | UCB |
| EB1360 | 6.503 | UCB |
| Irgacure 369 | 0.217 | Ciba |
| Sarcure SR1124 | 0.043 | Sartomer |
| Antioxidant Ir1035 | 0.033 | Ciba |

35.927 Gm of EB 600™ (acrylated epoxy oligomer, UCB, Smyrna, Ga.), 34.941 gm of SR 399™ (pentafunctional monomer, Sartomer, Exton, Pa.), 6.503 gm of EB1360™ (silicone acrylate, UCB, Smyrna, Ga.), 0.217 gm of Irgacure™ 369 (Ciba, Tarrytown, N.Y.), 0.043 gm of Sarcure SR1124 (ITX, Isopropyl-9H-thioxanthen-9-one, Sartomer, Exton, Pa.), 0.033 gm of Irganox™ 1035 (Ciba, Tarrytown, N.Y.) and 20.337 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 8"×8" electroformed Ni male mold for an array of 90 μm (length)×90 μm (width)×27 μm (depth)×11 μm (width of top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 12A, with the primer layer facing the Ni mold using a Hot Roll Laminator (ChemInstrument, Fairfield, Ohio) preset at a roller temperature of 200° F., lamination speed of 1 cm/sec and the roll pressure is 80 psi. A UV curing station with a UV intensity of 1.2 mw/cm$^2$ was used to cure the panel for 5.5 seconds. The ITO/PET film was then peeled away from the Ni mold at a peeling angle of about 30 degree to give a 8"×8" microcup array on ITO/PET. An acceptable release of the microcup array from the mold was observed. The thus obtained microcup array was further post-cured with a UV conveyor curing system (DDU, Los Angles, Calif.) with a UV dosage of 2.8 J/cm$^2$.

C. Filling and Sealing of the Microcups

An electrophoretic dispersion was filled into the microcups prepared from Preparation 12B using a #0 drawdown bar. The filled microcups were then over coated with a top-sealing/adhesive solution consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl] 2-morpholinopropan-1-one), 40.8 parts by weight of MEK, 40.8 parts by weight of IPAc and 4.3 parts by weight of CHO (cyclohexanone) with a doctor blade. The sealing layer was air-dried for 10 minutes and heated in an 80° C. oven for 2 minutes to form a seamless sealing on the filled microcup. The targeted (dry) thickness of the sealing layer was about 3-4 microns. The top-sealed microcup was laminated directly onto a 5 mil ITO/PET film by a laminator at 120° C. at a linear speed of 20 cm/min. After lamination, the sample was further UV cured by passing through a UV conveyer twice at the speed of 10 ft/min with a UV intensity of 2.56 W/cm$^2$ (which is equivalent to 0.856 J/cm$^2$).

Electro-Optic Response of EPDs

The electro-optic response of all exemplified EPDs was measured by bringing an incoming light from an optical fiber cable connected to a light source and illuminating on a display sample prepared in Preparation 12. The back side of the display sample was blackened completely by a black paint.

The reflecting light from the display sample was then collected and converted into electrical signal by a photoelectric detector and finally recorded and displayed on an oscilloscope. The intensity of output waveform correlates to the contrast ratio between ON and OFF states of the display and the slope of optical output waveform reflects the response time of the display during switch.

Unless specified otherwise, all wt % in the electrophoretic dispersion are on dry weight basis based on the total weight of an electrophoretic dispersion.

EXAMPLES 1 to 4

Improvement of Threshold Voltage by Fluorolink D

Example 1

Comparative Example

An EPD sample was prepared according to the procedure of Preparation 12 using an electrophoretic dispersion containing 9 wt % (dry) of the $TiO_2$-containing microparticles B (from Preparation 11) and 1.3 wt % (dry) of $CuPc-C_8F_{17}$ dye (from Preparation 8) in HT-200.

The electro-optical response was measured from 0V to 40V as indicated as the "Control" curve in FIG. 1. No threshold voltage was observed since a strong optical signal was detected even at low driving voltages such as 5 volts.

Example 2

Effect of Fluorolink D

The procedure of Example 1 was followed except that 5 wt % (based on the dry weight of $TiO_2$-containing microparticles) of Fluorolink D (from Solvay Solexis) was added to the electrophoretic dispersion.

The electro-optical response was measured from 0V to 40V as indicated as the "Example 2" curve in FIG. 1, which shows that after post-addition of Fluorolink D, a significant threshold characteristic was observed. However, the threshold characteristics was not stable and became weaker or not detectable completely as the operation temperature increased from room temperature to about $\geq 35°$ C.

Example 3

Effect of $R_f$-pyridine

The procedure of Example 2 was followed except that 0.5 wt % (based on the weight of $TiO_2$-containing microparticles) of $R_f$-pyridine (from Preparation 1) was added to the electrophoretic dispersion.

Figure 2:
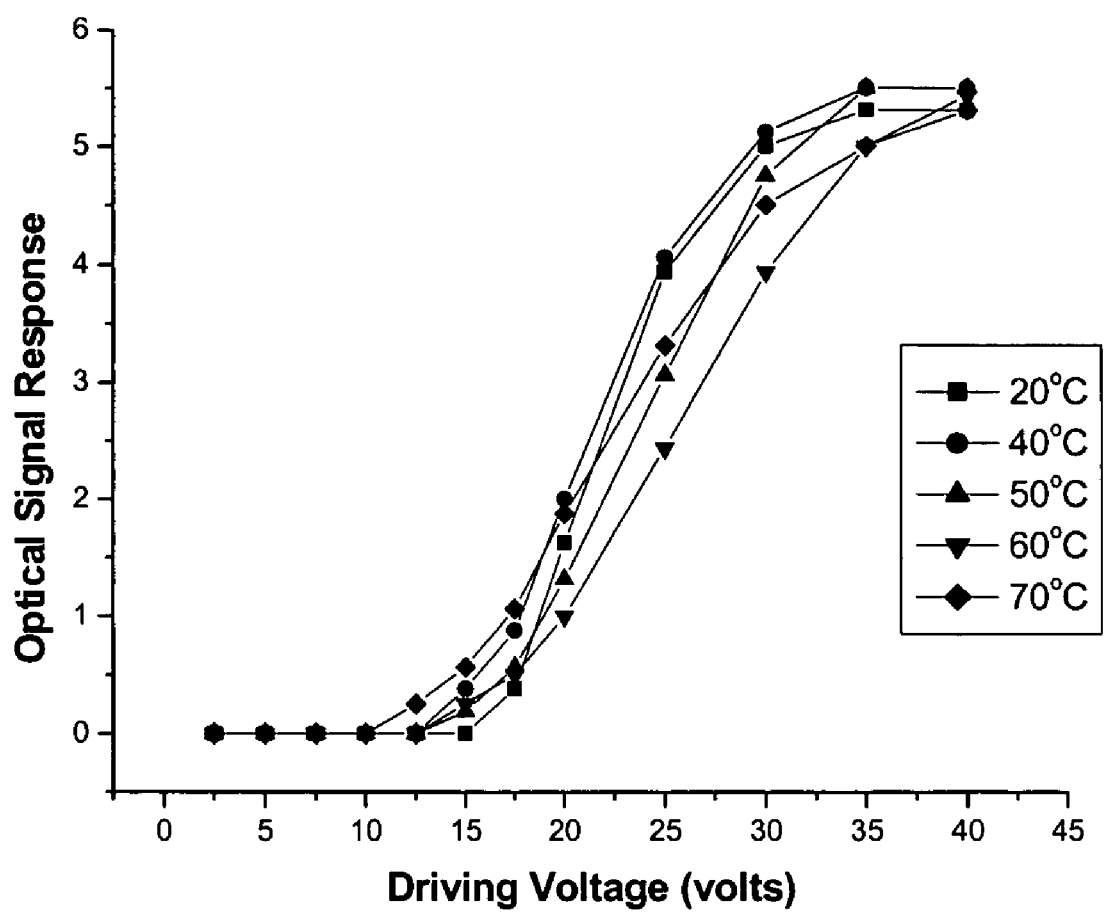
FIG. 2 illustrates the electro-optical response of Example 3 measured from 0 to 40 volts at different temperatures ranging from 20° C. to 70° C. The threshold characteristics of Example 3 remained almost the same throughout the temperature range studied.

The non-linear electro-optical response from 0V to 40V was measured at different temperatures ranging from 20 to 70° C. FIG. 2 shows that not only the threshold characteristics was enhanced, but also the threshold temperature latitude was significantly improved as the non-linear electro-optic response curves were almost overlapping when measured from 20° C. to 70° C.

Example 4

Effect of Perfluoroether Carboxylic Acid, Krytox FSL

The procedure of Example 2 was followed except that 0.5 wt % (based on the weight of $TiO_2$-containing microparticles) of Krytox FSL (from Dupont) was added to the electrophoretic dispersion. Krytox FSL is an additive of Formula (A-1) wherein $R_f$ is $R_f$-1, n is 1, X is absent, A is carboxyl and B is hydrogen.

Figure 3:
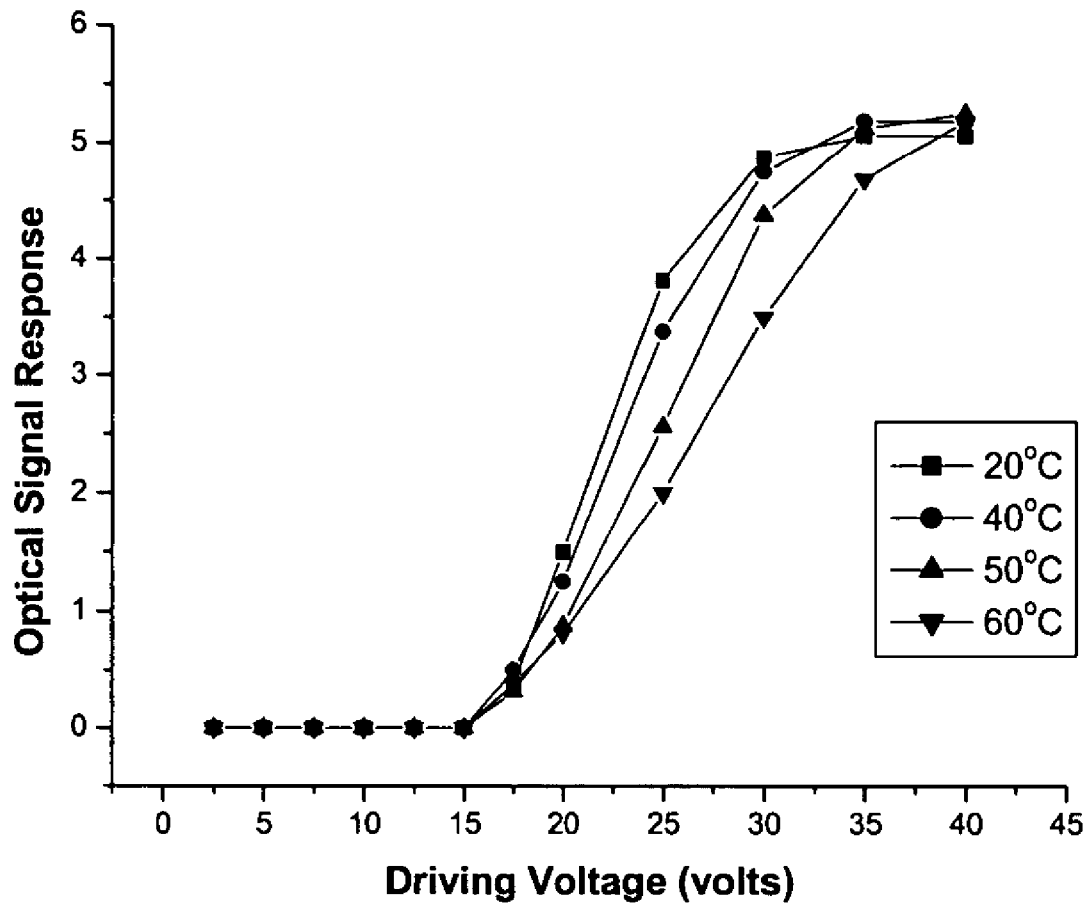
FIG. 3 illustrates the electro-optical response of Example 4 measured from 0 to 40 volts at different temperatures ranging from 20° C. to 60° C. The threshold voltages of Example 4 remained almost the same throughout the temperature range studied.

The non-linear electro-optical response from 0V to 40V was measured at different temperatures ranging from 20 to 60° C. FIG. 3 shows that not only the threshold characteristics was enhanced, but the threshold temperature latitude was also significantly improved as the non-linear electro-optic response curves were almost overlapping when measured from 20° C. to 60° C. In some cases, further improvements in the temperature latitude and switching performance may be obtained when both $R_f$-pyridine and Krytox FSL were added to the Example 2.

EXAMPLES 5-8

Example 5

Comparative Example

Figure 4:
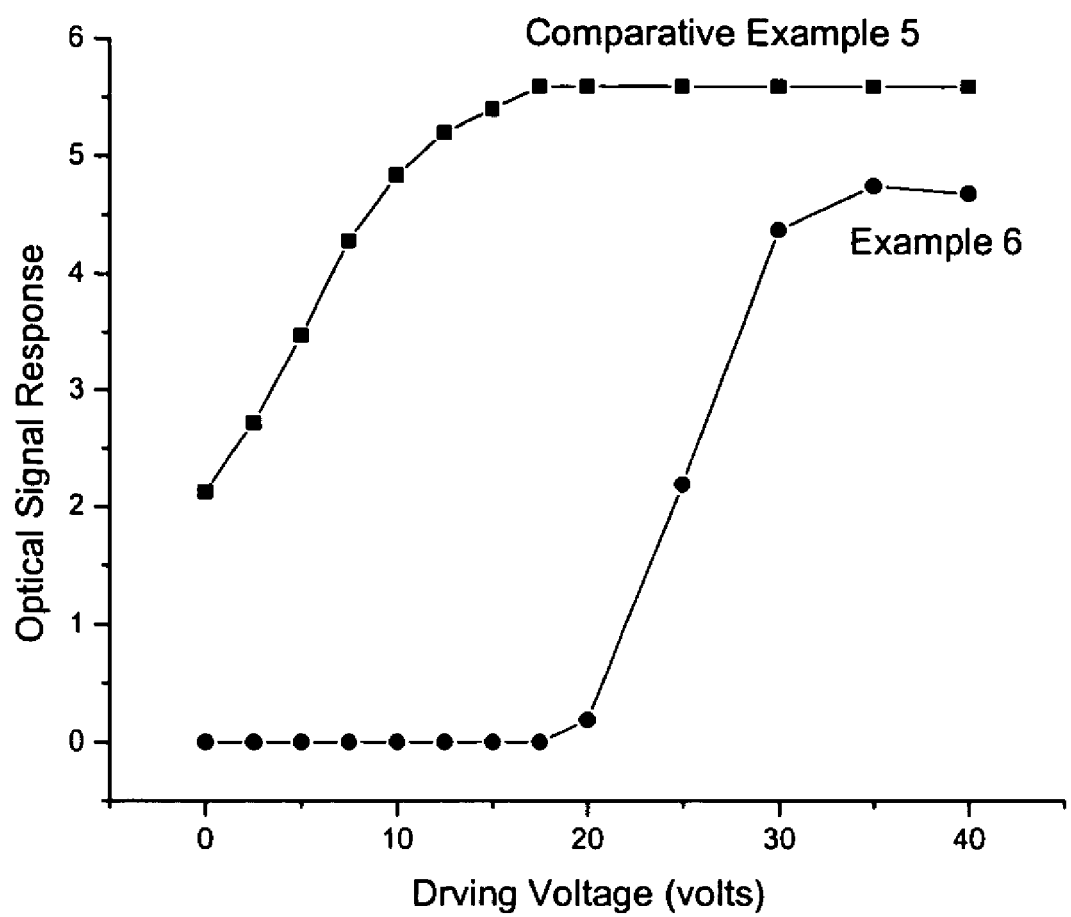
FIG. 4 illustrates the electro-optical response of Comparative Example 5 and Example 6 measured from 0 to 40 volts.

An EPD sample was prepared according to the procedure of Preparation 12 with an electrophoretic dispersion containing 9 wt % (dry) of the $TiO_2$-containing microparticles A (from Preparation 10) and 1.3 wt % (dry) of CuPc dye (from Preparation 8) in HT-200. The particle surface charge polarity was measured in an ITO-glass cell with a 100 μm gap by electrophoresis separation at different voltages. As indicated in Table 1, the particles showed a "positive" surface charge polarity when measured at above 10 V. No threshold characteristics was observed since an optical signal was detected even at low driving voltages such as 5 volts as shown in FIG. 4.

Example 6

Effect of L2ME

The procedure of Example 5 was followed except that 3 wt % (based on the total weight of $TiO_2$-containing microparticles) of L2ME (from Preparation 4.7) was added into the electrophoretic dispersion. The polarity of particle surface charge was measured by electrophoresis in an ITO-glass cell separated with a 100 μm spacer at an applied voltage of 10-50 V. The electro-optical response and surface charge polarity of this dispersion were summarized in FIG. 4 and Table 1, respectively. For comparison, the electro-optical response and surface charge polarity of the particles of Example 5 (Comparative Example) are also included in FIG. 4 and Table 1.

As it can be seen in Table 1, the particles of Example 6 showed a negative surface charge polarity when measured at a voltage less than 30V, but a positive surface charge polarity at a voltage $\geq 30V$.

TABLE 1

Polarity of particle surface charge as measured by electrophoresis

| | 10 V | 20 V | 30 V | 40 V | 50 V |
|---|---|---|---|---|---|
| Example 5 | neutral to slightly positive | positive | positive | positive | positive |
| Example 6 | negative | negative | neutral or slightly positive | positive | positive |

Figure 5:
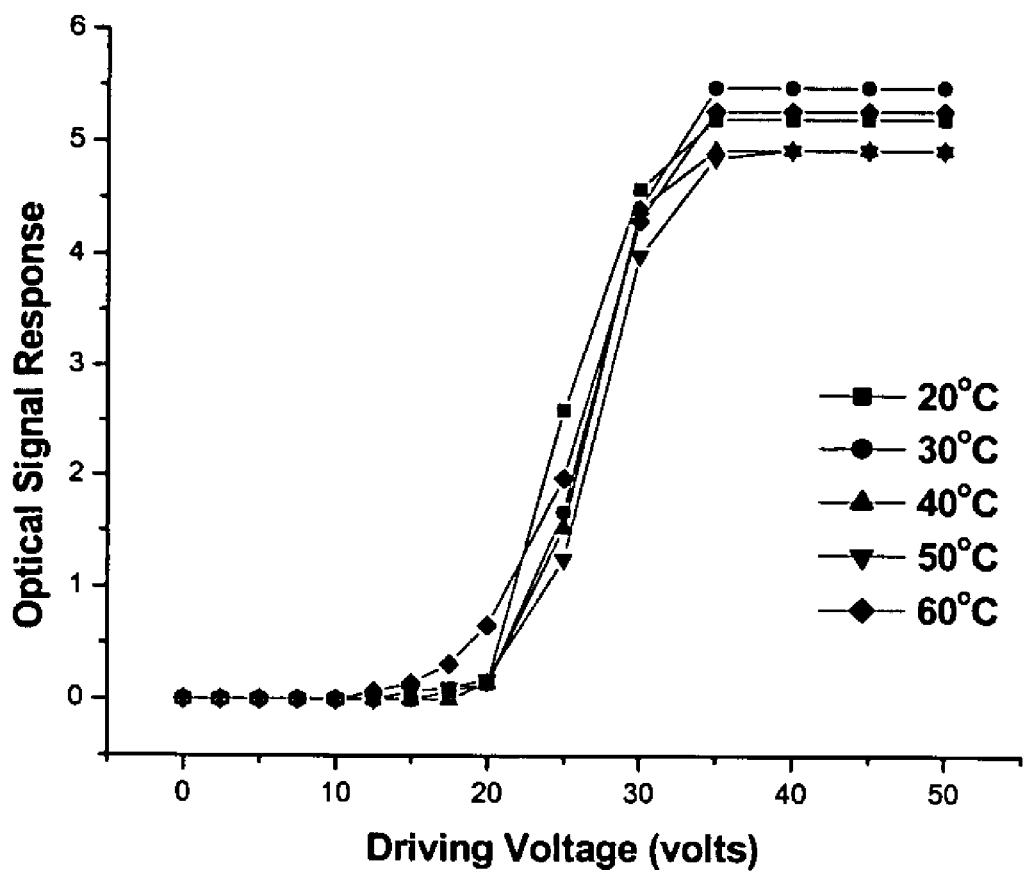
FIG. 5 illustrates the electro-optical response of Example 6 measured from 0 to 50 volts at different temperatures ranging from 20° C. to 60° C.

As shown in FIG. 4, a significant threshold voltage was observed after post-addition of L2ME to the electrophoretic dispersion. The non-linear electro-optical response from 0V to 50V was measured at different temperatures ranging from 20 to 60° C. (FIG. 5). As it can be seen in FIG. 5, the threshold characteristics of Example 6 remained almost unchanged from 20° C. to 60° C.

Example 7

Effect of L2EtA

Figure 6:
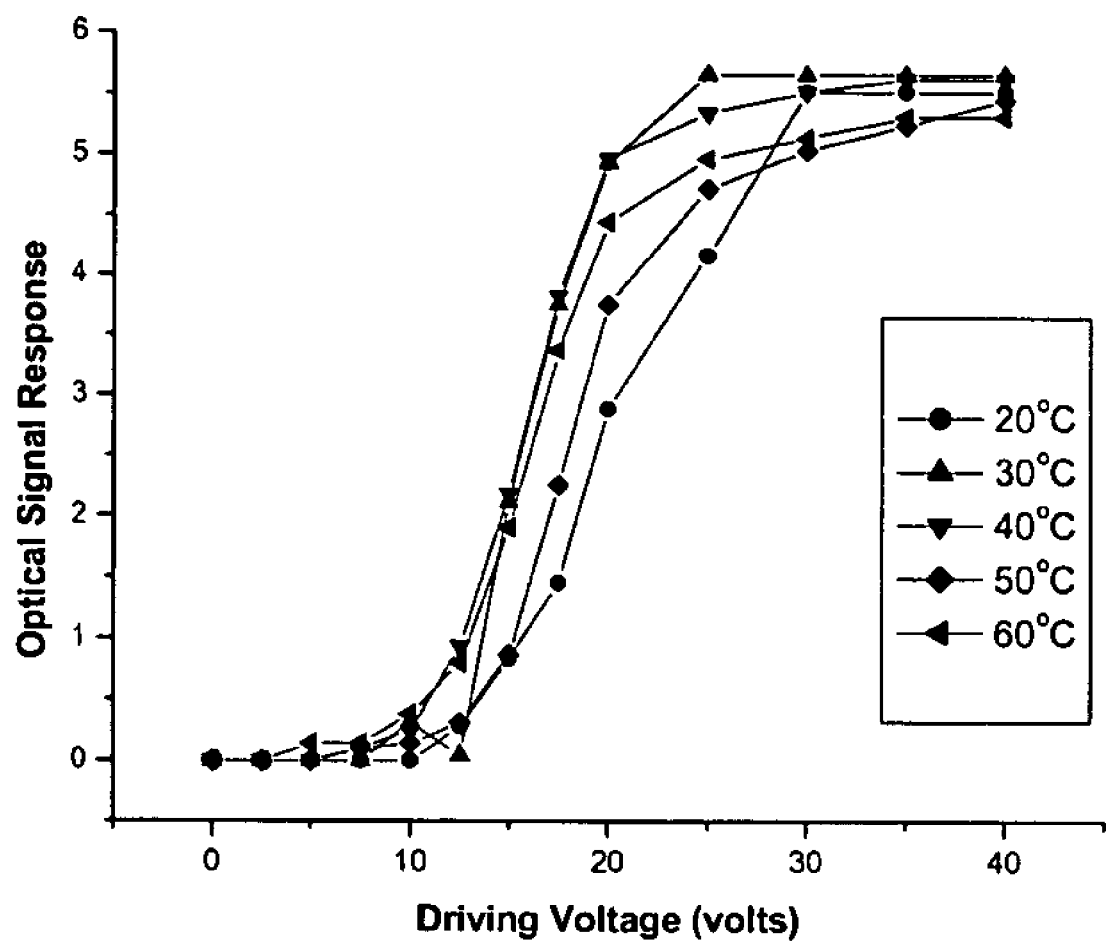
FIG. 6 illustrates the electro-optical response of Example 7 measured from 0 to 40 volts at different temperatures ranging from 20° C. to 60° C.

An EPD sample was prepared according to the procedure of Preparation 12 using an electrophoretic dispersion containing 9 wt % (dry) of the $TiO_2$-containing microparticles A (from Preparation 10), 1.6 wt % (dry) of CuPc dye (from Preparation 8) and 1.5 wt % (based on the dry weight of $TiO_2$-containing microparticles used) of L2EtA (from Preparation 4.6) in HT-200. The non-linear electro-optical response from 0 V to 40 V was measured at different operation temperatures ranging from 20 to 60° C. (FIG. 6). The threshold characteristics of Example 7 remained about the same from 20° C. to 60° C.

Example 8

Effect of L2EA

Figure 7:
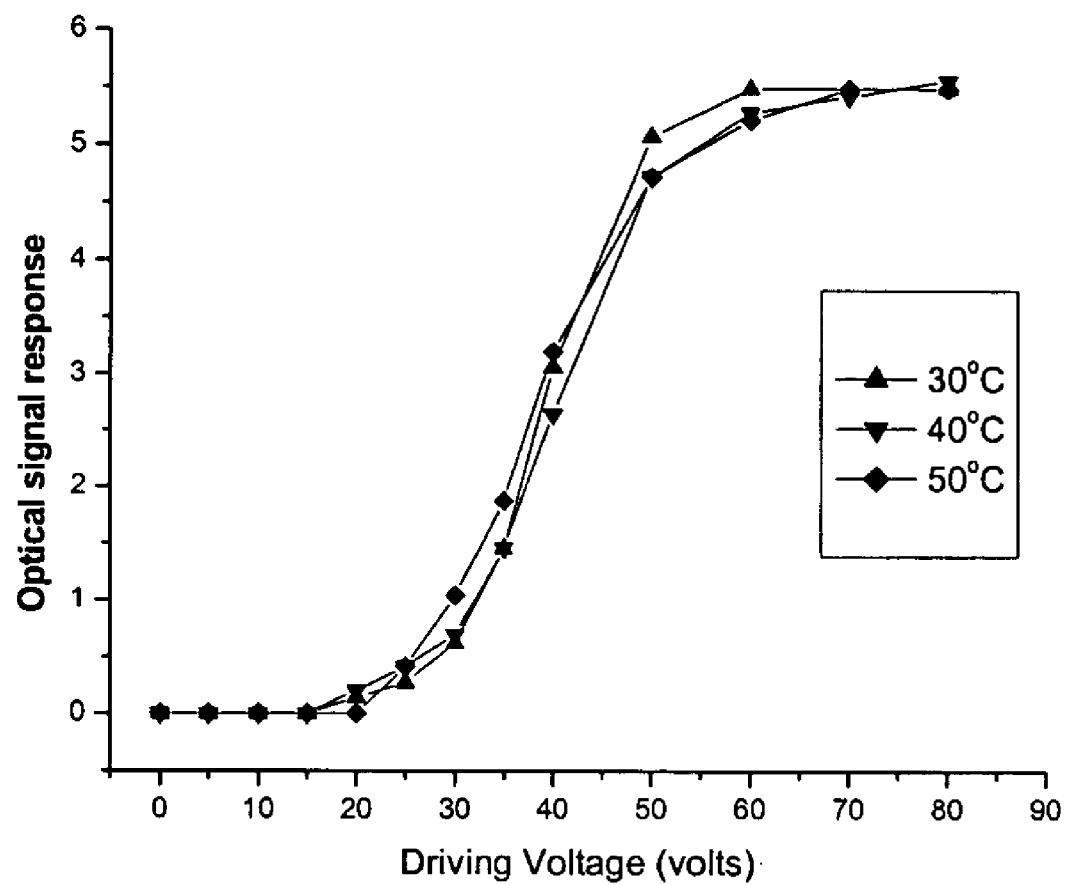
FIG. 7 illustrates the electro-optical response of Example 8 measured from 0 to 80 volts at different temperatures ranging from 30° C. to 50° C.

An EPD sample was prepared according to the procedure of Preparation 12 using an electrophoretic dispersion containing 9 wt % (dry) of the $TiO_2$-containing microparticles A (from Preparation 10), 1.6 wt % (dry) of CuPc dye (from Preparation 8) and 3 wt % (based on the dry weight of $TiO_2$-containing microparticles used) of L2EA (from Preparation 4.1), in HT-200. The non-linear electro-optical response from 0 V to 80 V was measured at different temperatures ranging from 30 to 50° C. (FIG. 7). The threshold characteristics of Example 8 remained about the same from 30° C. to 50° C.

It is evident that all additives of this invention are effective in improving both the display threshold characteristics and temperature latitude of passive matrix displays even when the electrode conductor is not in direct contact with the electrophoretic dispersion.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for improving threshold characteristics and temperature latitude of an electrophoretic display, which method comprises
   a) preparing an electrophoretic dispersion comprising electrophoretic pigment-containing microparticles dispersed in a dielectric solvent or solvent mixture wherein said electrophoretic pigment-containing microparticles are prepared from microencapsulation having a continuous phase which comprises a protective colloid; and
   b) adding into said electrophoretic dispersion one or more fluorinated additives represented by the following formulas (A-1), (A-2), (B-1), (B-2) and (B-3):

$R_f$—(—X-A-B)$_n$ (A-1)

B-(-A-X—$R_f$—X'-A'-B)$_n$ (A-2)

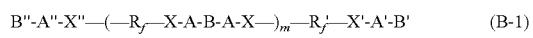

B''-A''-X''—(—$R_f$—X-A-B-A-X—)$_m$—$R_f$'—X'-A'-B' (B-1)

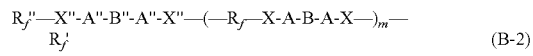

$R_f$''—X''-A''-B''-A''-X''—(—$R_f$—X-A-B-A-X—)$_m$—
$R_f$' (B-2)

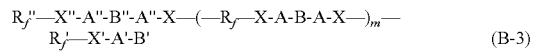

$R_f$''—X''-A''-B''-A''-X—(—$R_f$—X-A-B-A-X—)$_m$—
$R_f$'—X'-A'-B' (B-3)

wherein:
   n is an integer which is $\geq 1$;
   m is 0 or an integer which is $\geq 1$;
   $R_f$, $R_f'$ and $R_f''$ are independently a fluorinated moiety;
   X, X' and X'' are independently absent or a linking group;
   A, A' and A'' are independently —O—, —C(O)O—, —O(O)C—, —C(O)NR$^2$—, —R$^2$NC(O)—, —R$^2$NC(O)NR$^3$—, —R$^2$NC(O)O— or —OC(O)NR$^2$—, wherein R$^2$ and R$^3$ are independently hydrogen or alkyl;
   B, B' and B'' are independently hydrogen, N≡, optionally substituted alkyl, optionally substituted aryl, optionally substituted heteroalkyl or optionally substituted heteroaryl; or N and R$^2$ in —C(O)NR$^2$—or —R$^2$NC(O)— of A form a cyclic moiety with B; or N and R$^3$ in —R$^2$NC(O)NR$^3$— of A form a cyclic moiety with B; or N and R$^2$ in —R$^2$NC(O)O— or —OC(O)NR$^2$— of A form a cyclic moiety with B.

2. The method of claim 1 wherein n is 1-4 or m is 0-5.

3. The method of claim 1 wherein $R_f$, $R_f'$ and $R_f''$ are independently a fluorinated alkyl, fluorinated aryl, fluorinated-arylalkyl, aryl-fluorinated alkyl, fluorinated-alkylaryl, alkyl-fluorinated aryl or a fluorinated polymeric or oligomeric chain.

4. The method of claim 1 wherein X, X' and X'' are independently alkylene, arylene, alkylene-oxy or alkylene-NR$^1$— wherein R$^1$ is hydrogen or alkyl.

5. The method of claim 1 wherein the additive comprises at least 20% by weight of fluorine.

6. The method of claim 1 wherein $R_f$, $R_f'$ or $R_f''$ is represented by Formula ($R_f$) below:

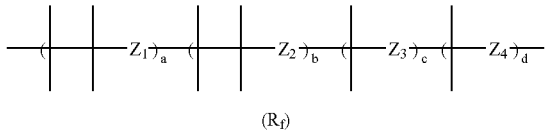

($R_f$)

wherein the open un-designated substituent positions on the main chain are independently selected from the group consisting of hydrogen, halogen, alkyl, aryl, alkylaryl, arylalkyl, fluoroalkyl, fluoroaryl, fluoro-alkylaryl, alkylfluoro-aryl, fluoro-arylalkyl, arylfluoro-alkyl, —OR$^4$, —OC(O)R$^4$, —C(O)OR$^4$, and —C(O)NR$^4$R$^5$—, wherein R$^4$ and R$^5$ are independently hydrogen, alkyl, aryl, alkylaryl, arylalkyl, fluoroalkyl, fluoroaryl, fluoro-alkylaryl, alkylfluoro-aryl, fluoro-arylalkyl, arylfluoro-alkyl or a fluorinated polyether;
   $Z_1$, $Z_2$, $Z_3$ and $Z_4$ are independently oxygen or absent; and
   a, b, c and d are independently from 0 to 500 and the sum of a+b+c+d is from 3 to 1000.

7. The method of claim 6 wherein the open un-designated substituent positions are independently a fluorine or a fluorinated alkyl.

8. The method of claim 7 wherein the fluorinated alkyl is fluorinated methyl.

9. The method of claim 1 wherein X, X' and X'' are independently absent or alkylene.

10. The method of claim 1 wherein the additive is Formula (A-1) wherein n is 1, X is absent, A is —COO— and B is hydrogen, or Formula (A-1) wherein n is 1, X is absent, A is —C(O)NR²— and —R²NC(O)— wherein R² is hydrogen or alkyl and B is a heteroarylalkyl, or a mixture thereof.

11. The method of claim 1 wherein the additive is Formula (A-1) wherein n is 2, X is absent or alkylene, A is —C(O)NR²— wherein R² is hydrogen or alkyl.

12. The method of claim 1 wherein the additive is Formula (A-1) wherein A is —R²NC(O)NR³— or —OC(O)NR²— in which R² and R³ are independently hydrogen or alkyl.

13. The method of claim 1 wherein the additive is Formula (A-2) in which n is 2 or 3, B is N≡, an alkyl or a heteroalkyl, A and A' are independently —C(O)NR²—, —R²NC(O)—, —R²NC(O)NR³—, —C(O)O—, —O(O)C—, —R²NC(O)O— or —OC(O)NR²—, X and X' are independently absent or alkylene and B' is an optionally substituted alkyl or optionally substituted aryl.

14. The method of claim 1 wherein the additive is Formula (B-1) in which m is 1 or 2, X, X' and X" are independently absent or alkylene, A, A' and A" are independently —C(O)NR²—, —R²NC(O)—, —R²NC(O)NR³—, —R²NC(O)O— or —OC(O)NR²— wherein R² and R³ are independently hydrogen or alkyl; and B, B' and B" are independently an optionally substituted alkyl or optionally substituted aryl.

15. An electrophoretic dispersion which comprises electrophoretic pigment-containing microparticles dispersed in a dielectric solvent or solvent mixture and one or more fluorinated additives represented by the following Formulas (A-1), (A-2), (B-1), (B-2) and (B-3):

  (A-1)

  (A-2)

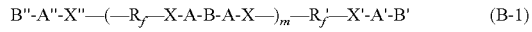  (B-1)

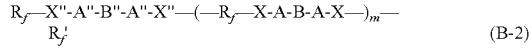  (B-2)

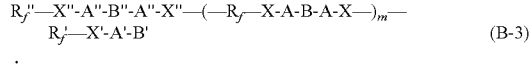  (B-3)

wherein:
n is an integer which is ≧1;
m is 0 or an integer which is ≧1;
$R_f$, $R_f'$ and $R_f''$ are independently a fluorinated moiety;
X, X' and X" are independently absent or a linking group;
A, A' and A" are independently —O—, —C(O)O—, —O(O)C—, —C(O)NR²—, —R²NC(O)—, —R²NC(O)NR³—, —R²NC(O)O— or —OC(O)NR²—, wherein R² and R³ are independently hydrogen or alkyl;
B, B' and B" are independently hydrogen, N≡, optionally substituted alkyl, optionally substituted aryl, optionally substituted heteroalkyl or optionally substituted heteroaryl; or N and R² in —C(O)NR²— or —R²NC(O)— of A form a cyclic moiety with B; or N and R³ in —R²NC(O)NR³— of A form a cyclic moiety with B; or N and R² in —R²NC(O)O— or —OC(O)NR²— of A form a cyclic moiety with B, wherein the electrophoretic pigment-containing microparticles are prepared from microencapsulation having a continuous phase which comprises a protective colloid.

16. The electrophoretic dispersion of claim 15 wherein $R_f$, $R_f'$ and $R_f''$ are independently a fluorinated alkyl, fluorinated aryl, fluorinated-arylalkyl, aryl-fluorinated alkyl, fluorinated-alkylaryl, alkyl-fluorinated aryl or a fluorinated polymeric or oligomeric chain.

17. The electrophoretic dispersion of claim 15 wherein X, X' and X" are independently alkylene, arylene, alkylene-oxy or alkylene-NR¹— wherein R¹ is hydrogen or alkyl.

18. The electrophoretic dispersion of claim 15 wherein A is —C(O)NR²— in which R² is alkyl.

19. The electrophoretic dispersion of claim 15 wherein A is —R²NC(O)NR³— or —OC(O)NR²— in which R² and R³ are independently hydrogen or alkyl.

20. An electrophoretic display comprising display cells filled with an electrophoretic dispersion which comprises:
a) electrophoretic pigment-containing microparticles;
b) a dielectric solvent or solvent mixture; and
c) one or more highly fluorinated additive represented by the following Formulas (A-1), (A-2), (B-1), (B-2) and (B-3):

  (A-1)

  (A-2)

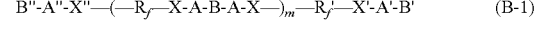  (B-1)

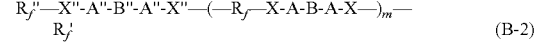  (B-2)

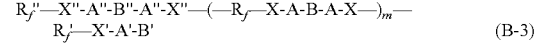  (B-3)

wherein:
n is an integer which is ≧1;
m is 0 or an integer which is ≧1;
$R_f$, $R_f'$ and $R_f''$ are independently a fluorinated moiety;
X, X' and X" are independently absent or a linking group;
A, A' and A" are independently —O—, —C(O)O—, —O(O)C—, —C(O)NR²—, —R²NC(O)—, —R²NC(O)NR³—, —R²NC(O)O— or —OC(O)NR²—, wherein R² and R³ are independently hydrogen or alkyl;
B, B' and B" are independently hydrogen, N≡, optionally substituted alkyl, optionally substituted aryl, optionally substituted heteroalkyl or optionally substituted heteroaryl; or N and R² in —C(O)NR²— or —R²NC(O)— of A form a cyclic moiety with B; or N and R³ in —R²NC(O)NR³— of A form a cyclic moiety with B; or N and R² in —R²NC(O)O— or —OC(O)NR²— of A form a cyclic moiety with B. wherein the electrophoretic pigment-containing microparticles are prepared from microencapsulation having a continuous phase which comprises a protective colloid.

21. The electrophoretic display of claim 20 wherein $R_f$, $R_f'$ and $R_f''$ are independently a fluorinated alkyl, fluorinated aryl, fluorinated-arylalkyl, aryl-fluorinated alkyl, fluorinated-alkylaryl, alkyl-fluorinated aryl or a fluorinated polymeric or oligomeric chain.

22. The electrophoretic display of claim 20 wherein X, X' and X" are independently alkylene, arylene, alkylene-oxy or alkylene-NR¹— wherein R¹ is hydrogen or alkyl.

23. The electrophoretic display of claim 20 wherein A is —C(O)NR²— in which R² is alkyl.

24. The electrophoretic display of claim 20 wherein A is —R²NC(O)NR³— or —OC(O)NR²— in which R² and R³ are independently hydrogen or alkyl.

25. The electrophoretic display of claim 20 which is prepared by the microcup technology.

26. The electrophoretic display of claim 20 which is prepared by a microencapsulation process.

27. The electrophoretic display of claim 20 which has a traditional up/down switching mode, or an in-plane switching mode or a dual switching mode.

28. The method of claim 5 wherein the additive comprises at least 30% by weight of fluorine.

29. The method of claim 28 wherein the additive comprises at least 50% by weight of fluorine.

30. The method of claim 6 wherein a and d are 0, $Z_2$ is oxygen and $Z_3$ is absent.

31. The method of claim 6 wherein a is 0, $Z_2$ and $Z_3$ are oxygen and $Z_4$ is absent.

32. The method of claim 8 wherein c and d are 0, $Z_1$ is oxygen and $Z_2$ is absent.

33. The method of claim 30 wherein Formula ($R_f$) is —$(C_3F_6O)_y CF(CF_3)$— wherein y is 1-500.

34. The method of claim 31 wherein Formula ($R_f$) is —$CF_2O(CF_2CF_2O)_y(CF_2O)_z CF_2$— wherein y and z are independently 1-500.

35. The method of claim 32 wherein Formula ($R_f$) is —$(C_3F_6O)_y CF_2CF_2$— wherein y is 1-500.

36. The method of claim 10 wherein $R_f$ is —$(C_3F_6O)_y CF(CF_3)$— wherein y is 1-500.

37. The method of claim 10 further comprising another additive which is Formula (A-1) wherein n is 2, X is methylene, A is —O— and B is hydrogen.

38. The method of claim 37 wherein $R_f$ is —$CF_2O(CF_2CF_2O)_y(CF_2O)_z CF_2$— wherein y and z are independently 1-500.

39. The method of claim 11 wherein $R^2$ is alkyl.

40. The method of claim 11 wherein B is an optionally substituted alkyl.

41. The method of claim 11 wherein B is a cyclic alkyl of 3-8 carbon atoms.

42. The method of claim 39 wherein B with N and $R^2$ in —$C(O)NR^2$— or $R^2NC(O)$— forms a heterocyclic moiety having 4-8 members.

43. The method of claim 12 wherein one of $R^2$ and $R^3$ in —$R^2NC(O)NR^3$— is hydrogen and the other is alkyl or both are alkyl.

44. The method of claim 12 wherein $R^2$ in —$R^2NC(O)O$— or $OC(O)NR^2$— is alkyl.

45. The method of claim 12 wherein B is an optionally substituted alkyl or an optionally substituted aryl.

46. The electrophoretic dispersion of claim 19 wherein one of $R^2$ and $R^3$ in —$R^2NC(O)NR^3$— is hydrogen and the other is alkyl or both are alkyl.

47. The electrophoretic dispersion of claim 19 wherein $R^2$ in —$R^2NC(O)O$— or —$OC(O)NR^2$— is alkyl.

48. The electrophoretic dispersion of claim 15 wherein said electrophoretic pigment-containing microparticles are prepared by a process comprising an interfacial polymerization or crosslinking step, or by a process comprising an in-situ polymerization step, or by a process comprising a coacervation step.

49. The electrophoretic dispersion of claim 15 wherein said electrophoretic pigment-containing microparticles comprise a charge controlling agent.

50. The electrophoretic dispersion of claim 15 wherein said one or more additives are present in the amount of from about 0.5% to about 10% by weight based upon the total dry weight of the electrophoretic pigment-containing microparticles.

51. The electrophoretic display of claim 24 wherein one of $R^2$ and $R^3$ in —$R^2NC(O)NR^3$— is hydrogen and the other is alkyl or both are alkyl.

52. The electrophoretic display of claim 24 wherein $R^2$ in —$R^2NC(O)O$— or —$OC(O)NR^2$— is alkyl.

53. The method of claim 1 wherein said one or more additives are present in the amount of from about 0.5% to about 10% by weight based upon the total dry weight of the electrophoretic pigment-containing microparticles.

54. The electrophoretic display of claim 20 wherein said one or more additives are present in the amount of from about 0.5% to about 10% by weight based upon the total dry weight of the electrophoretic pigment-containing microparticles.

55. The method of claim 1 wherein said one or more additives are present in the amount of from about 0.1% to about 30% by weight based upon the total dry weight of the electrophoretic pigment-containing microparticles.

56. The electrophoretic dispersion of claim 15 wherein said one or more additives are present in the amount of from about 0.1% to about 30% by weight based upon the total dry weight of the electrophoretic pigment-containing microparticles.

57. The electrophoretic display of claim 20 wherein said one or more additives are present in the amount of from about 0.1% to about 30% by weight based upon the total dry weight of the electrophoretic pigment-containing microparticles.

58. The method of claim 1 wherein said protective colloid comprises a reactive functional group selected from the group consisting of amino, hydroxy, thiol, isocyanate, thioisocyanate, epoxide, aziridne, a short-chain alkoxysilyl, a carboxylic acid derivative, chloroformate and other functional groups capable of undergoing interfacial polymerization or crosslinking.

59. The electrophoretic dispersion of claim 15 wherein said protective colloid comprises a reactive functional group selected from the group consisting of amino, hydroxy, thiol, isocyanate, thioisocyanate, epoxide, aziridne, a short-chain alkoxysilyl, a carboxylic acid derivative, chloroformate and other functional groups capable of undergoing interfacial polymerization or crosslinking.

60. The electrophoretic display of claim 20 wherein said protective colloid comprises a reactive functional group selected from the group consisting of amino, hydroxy, thiol, isocyanate, thioisocyanate, epoxide, aziridne, a short-chain alkoxysilyl, a carboxylic acid derivative, chloroformate and other functional groups capable of undergoing interfacial polymerization or crosslinking.

61. The method of claim 1 wherein said electrophoretic pigment-containing microparticles are formed by emulsifying an internal phase comprising primary pigment particles and a polymer precursor into said continuous phase.

62. The electrophoretic dispersion of claim 15 wherein said electrophoretic pigment-containing microparticles are formed by emulsifying an internal phase comprising primary pigment particles and a polymer precursor into said continuous phase.

63. The electrophoretic display of claim 20 wherein said electrophoretic pigment-containing microparticles are formed by emulsifying an internal phase comprising primary pigment particles and a polymer precursor into said continuous phase.

* * * * *